(12) United States Patent
Kato et al.

(10) Patent No.: US 12,596,250 B2
(45) Date of Patent: Apr. 7, 2026

(54) LIGHT SCANNING APPARATUS AND IMAGE FORMING APPARATUS

(71) Applicant: CANON KABUSHIKI KAISHA, Tokyo (JP)

(72) Inventors: Hayato Kato, Tochigi (JP); Kazumi Kimura, Saitama (JP); Hiroki Yoshida, Tochigi (JP); Toshifumi Chida, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 216 days.

(21) Appl. No.: 18/638,880

(22) Filed: Apr. 18, 2024

(65) Prior Publication Data

US 2024/0353673 A1      Oct. 24, 2024

(30) Foreign Application Priority Data

Apr. 24, 2023      (JP) ................................. 2023-070793

(51) Int. Cl.
*G02B 26/10* (2006.01)
*B41J 2/47* (2006.01)
(Continued)

(52) U.S. Cl.
CPC .............. *G02B 26/10* (2013.01); *B41J 2/471* (2013.01); *G02B 26/0816* (2013.01);
(Continued)

(58) Field of Classification Search
CPC .. G02B 26/10; G02B 26/0816; G02B 26/125; G02B 26/105; B41J 2/471;
(Continued)

(56) References Cited

U.S. PATENT DOCUMENTS

| | | | |
|---|---|---|---|
| 10,138,549 B2 | 11/2018 | Kimura | |
| 2008/0291517 A1* | 11/2008 | Yoshida | ............... G02B 26/105 |
| | | | 359/215.1 |
| 2014/0160216 A1 | 6/2014 | Kimura | |

FOREIGN PATENT DOCUMENTS

JP      2006126857 A  *  5/2006

OTHER PUBLICATIONS

English machine translation of Manabu et al. (JP_2006126857_A (Year: 2006).*

* cited by examiner

*Primary Examiner* — Douglas X Rodriguez
*Assistant Examiner* — Natasha Dephenia Quinn
(74) *Attorney, Agent, or Firm* — Carter, DeLuca & Farrell LLP

(57) ABSTRACT

A light scanning apparatus satisfies the following conditions: $0.60 \leq (dY_{max-}/d\theta)/(dY_0/d\theta) \leq 0.98$; and $0.50 < Sk/ft < 1.00$, where, when a deflecting unit rotates at a constant angular velocity, $\theta$ represents a scanning angle between a principal ray of a light flux immediately after deflected by the deflecting unit and an optical axis of an imaging optical system, $Y_0$ represents an on-axis image height, $Y_{max-}$ represents a first outermost off-axis image height on a side opposite to a light source with respect to the optical axis of the imaging optical system in a main scanning cross section, ft represents a focal distance of the imaging optical system in the main scanning cross section, and Sk represents a distance between a rear-side principal plane of the imaging optical system and a scanned surface on an optical path of a principal ray of the light flux that travels to the on-axis image height.

20 Claims, 8 Drawing Sheets

(51) Int. Cl.
  *G02B 26/08*      (2006.01)
  *G03G 15/043*      (2006.01)
  *G06K 15/02*      (2006.01)
  *G06K 15/14*      (2006.01)

(52) U.S. Cl.
  CPC ......... *G03G 15/0435* (2013.01); *G06K 15/14* (2013.01); *G06K 15/1848* (2013.01)

(58) Field of Classification Search
  CPC ........... G03G 15/0435; G03G 15/0409; G03G 15/043; G06K 15/14; G06K 15/1848
  See application file for complete search history.

LIGHT SCANNING APPARATUS AND IMAGE FORMING APPARATUS

BACKGROUND OF THE INVENTION

Field of the Invention

The present invention relates to a light scanning apparatus, which is particularly suitable for use in an image forming apparatus that uses an electrophotographic process, such as a laser beam printer and a multi-function printer.

Description of the Related Art

There has hitherto been proposed a light scanning apparatus reduced in size by shortening an optical path with use of a convergent light flux.

In this type of light scanning apparatus, when a convergent light flux is caused to be incident on a deflecting unit such as a polygon mirror that has relative surface eccentricity due to a manufacturing error or other factors, a jitter (hereinafter referred to as "a surface eccentricity jitter") may occur on a scanned surface.

In Japanese Patent Application Laid-Open No. 2006-126857, there is disclosed a light scanning apparatus that defines a relationship between a refractive power of an incident optical system and a refractive power of an imaging optical system for a reduction of the surface eccentricity jitter.

An upper limit to the degree of convergence of a light flux in the light scanning apparatus as disclosed in Japanese Patent Application Laid-Open No. 2006-126857 is determined from the degree of tolerance for a drop in image quality due to the surface eccentricity jitter.

That is, in the light scanning apparatus as disclosed in Japanese Patent Application Laid-Open No. 2006-126857, a size reduction with the use of a convergent light flux and a drop in image quality that accompanies occurrence of the surface eccentricity jitter have a trade-off relationship with each other, and it is consequently difficult to accomplish a satisfactory size reduction.

SUMMARY OF THE INVENTION

Accordingly, an object of the present invention is to provide a light scanning apparatus that is small in size and yet can satisfactorily suppress occurrence of a jitter.

According to the present invention, there is provided a light scanning apparatus including: a deflecting unit configured to deflect a light flux from a light source to scan a scanned surface in a main scanning direction; an incident optical system configured to guide the light flux from the light source to the deflecting unit; and an imaging optical system configured to guide the light flux deflected by the deflecting unit to the scanned surface, wherein, when the deflecting unit rotates at a constant angular velocity, a scanning angle between a principal ray of the light flux immediately after being deflected by the deflecting unit and an optical axis of the imaging optical system is represented by $\theta$, an on-axis image height is represented by $Y_0$, a first outermost off-axis image height on a side opposite to the light source with respect to the optical axis of the imaging optical system in a main scanning cross section is represented by Y max-, a focal distance of the imaging optical system in the main scanning cross section is represented by ft, and a distance between a rear-side principal plane of the imaging optical system and the scanned surface on an optical path of a principal ray of the light flux that travels to the on-axis image height is represented by Sk, the following conditions are satisfied:

$$0.60 \leq (dY_{max-}/d\theta)/(dY_0/d\theta) \leq 0.98; \text{ and}$$

$$0.5 < Sk/ft < 1.00.$$

Further features of the present invention will become apparent from the following description of exemplary embodiments with reference to the attached drawings.

DESCRIPTION OF THE EMBODIMENTS

Figure 1:
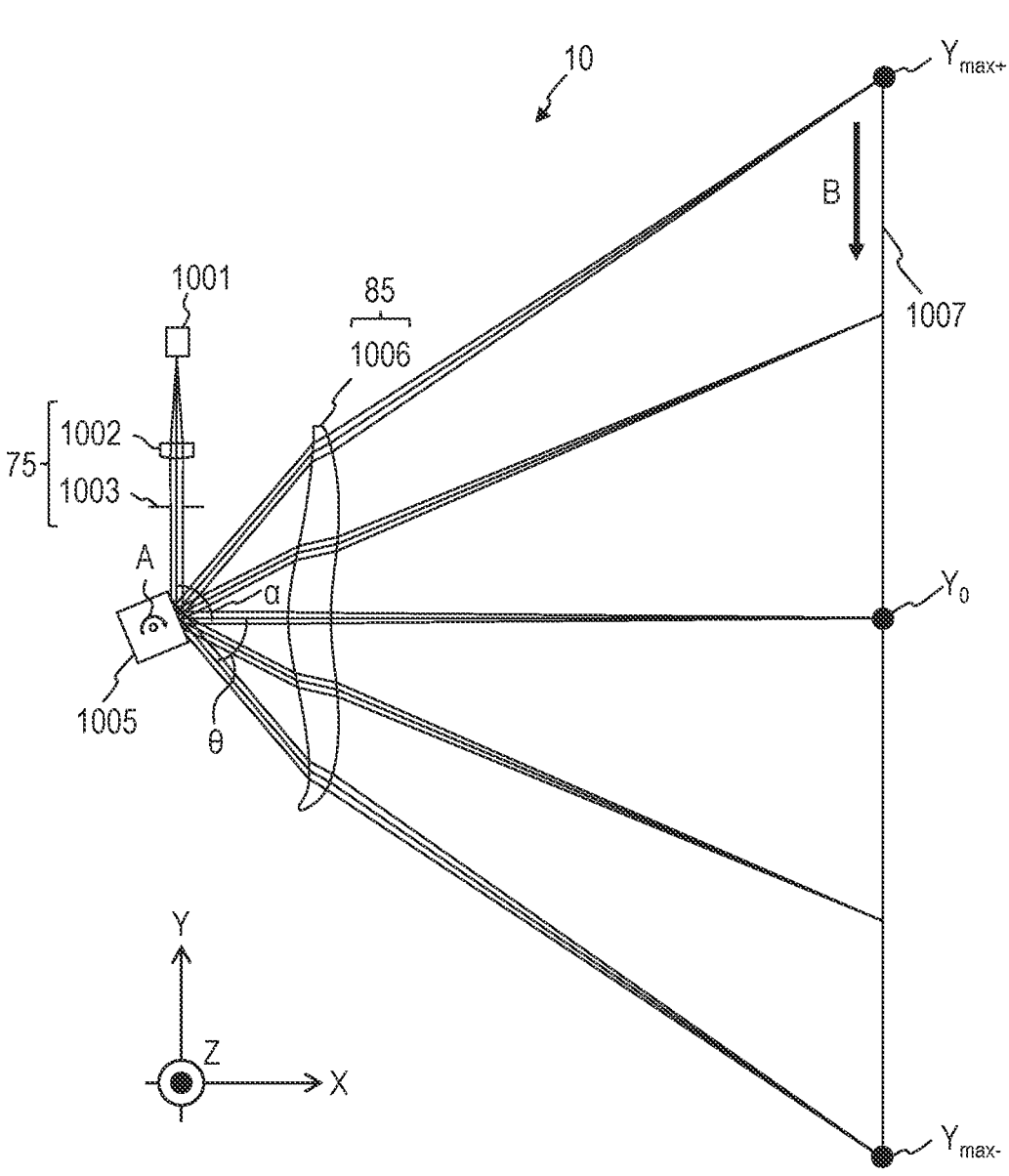
FIG. 1 is a schematic main scanning cross-sectional view of a light scanning apparatus according to a first embodiment of the present invention.

A light scanning apparatus according to each embodiment of the present invention is described in detail below with reference to the accompanying drawings. Some of the drawings referred to below may be drawn in scales different from the actual scale for easier understanding of the embodiments of the present invention.

In the following description, a main scanning direction refers to a direction perpendicular to a rotational axis of a deflecting unit and an optical axis of an imaging optical system (direction in which a light flux is deflected by the deflecting unit), and a sub-scanning direction refers to a direction parallel to the rotational axis of the deflecting unit. Further, a main scanning cross section refers to a cross section parallel to the main scanning direction and the optical axis of the imaging optical system (perpendicular to the sub-scanning direction), and a sub-scanning cross section refers to a cross section parallel to the sub-scanning direction and the optical axis of the imaging optical system (perpendicular to the main scanning direction).

In the following, a direction parallel to the optical axis of the imaging optical system is defined as an X direction, the main scanning direction is defined as a Y direction, and the sub-scanning direction is defined as a Z direction. Further, the unit of angles is represented by radian (rad).

First Embodiment

There has hitherto been proposed a configuration for scanning a scanned surface with the use of a convergent light flux in order to accomplish a cost reduction and a size reduction in a light scanning apparatus.

It has been known that, in this type of light scanning apparatus, when a convergent light flux is caused to be incident on a deflecting unit such as a polygon mirror that has relative surface eccentricity due to a manufacturing error or other factors, a jitter (hereinafter referred to as "a surface eccentricity jitter") may occur on the scanned surface.

A light scanning apparatus that defines a relationship between a refractive power of an incident optical system and a refractive power of an imaging optical system for a reduction of the surface eccentricity jitter has hitherto been proposed.

However, with the light scanning apparatus of the related art described above, it is difficult to satisfactorily reduce the surface eccentricity jitter and maintain the degree of convergence of a light flux for accomplishing a satisfactory size reduction at the same time.

In other words, an upper limit to the degree of convergence of a light flux in the light scanning apparatus of the related art described above is determined from the degree of tolerance for a drop in image quality due to the surface eccentricity jitter.

That is, in the light scanning apparatus of the related art described above, a size reduction with the use of a convergent light flux and a drop in image quality that accompanies occurrence of the surface eccentricity jitter have a trade-off relationship with each other, and it is consequently difficult to accomplish a satisfactory size reduction.

Accordingly, an object of the present invention is to provide a light scanning apparatus that is satisfactorily reduced in size with the use of a convergent light flux and yet can satisfactorily reduce a drop in image quality caused by occurrence of the jitter on a scanned surface.

FIG. 1 shows a schematic main scanning cross-sectional view of a light scanning apparatus 10 according to a first embodiment of the present invention.

The light scanning apparatus 10 according to the first embodiment includes a light source 1001, a coupling lens 1002, an aperture stop 1003, a deflecting unit 1005, and an imaging lens 1006.

A semiconductor laser can be used as the light source 1001, and the number of light emitting units may be one, and may be two or more.

The coupling lens 1002 is an anamorphic lens having refractive powers different from each other in the main scanning cross section and the sub-scanning cross section.

Specifically, the coupling lens 1002 converts a light flux emitted from the light source 1001 into a convergent light flux in the main scanning cross section, and condenses the light flux such that a focal line is formed at a position close to a deflecting surface of the deflecting unit 1005 in the sub-scanning cross section.

The aperture stop 1003 restricts a light flux diameter of the light flux that has passed through the coupling lens 1002 in each of the main scanning direction and the sub-scanning direction.

The deflecting unit 1005 is rotated by a driving motor (not shown) at a constant angular velocity about a rotational axis, to thereby deflect the light flux that has been incident on the deflecting surface.

In the light scanning apparatus 10 according to the first embodiment, the polygon mirror having four deflecting surfaces is used as the deflecting unit 1005. However, the deflecting unit 1005 is not limited thereto, and, for example, a polygon mirror having five or six deflecting surfaces may also be used.

In the light scanning apparatus 10 according to the first embodiment, a rotation speed of the deflecting unit 1005 may be changed for a while as required. In other words, the deflecting unit 1005 may be set so as to rotate at a constant angular velocity only in a predetermined range of time.

The imaging lens 1006 has a refractive power that condenses the light flux deflected by the deflecting unit 1005 onto a scanned surface 1007, and has a shape that enables scanning of the scanned surface 1007 at a non-constant speed.

In the light scanning apparatus 10 according to the first embodiment, an incident optical system 75 is configured from the coupling lens 1002 and the aperture stop 1003, and an imaging optical system 85 is configured from the imaging lens 1006.

The light flux emitted from the light source 1001 is converted into a convergent light flux in the main scanning cross section, and is condensed (guided) so as to form a focal line at a position close to a deflecting surface of the deflecting unit 1005 in the sub-scanning cross section by the incident optical system 75.

The light flux deflected by the deflecting unit 1005 is then condensed (guided) on the scanned surface 1007 by the imaging optical system 85, and the scanned surface 1007 is scanned in a direction B of FIG. 1 with the light flux by rotation of the deflecting unit 1005 about the rotational axis in a direction A of FIG. 1.

The scanned surface 1007 has, on one side of an on-axis image height $Y_0$ which is a side without the incident optical system 75 (an opposite-to-light-source side, a minus side in the main scanning direction), a first scanned region and, on the other side of the on-axis image height $Y_0$ which is a side with the incident optical system 75 arranged thereon (a light source side, a plus side in the main scanning direction), a second scanned region.

An outermost off-axis image height in the first scanned region (a first outermost off-axis image height) is represented by $Y_{max-}$, and an outermost off-axis image height in the second scanned region (a second outermost off-axis image height) is represented by $Y_{max+}$.

"Outermost off-axis image height" as used herein means a maximum image height in an effective region of the scanned surface 1007, that is, a printed area.

An angle (a scanning angle) between a traveling direction of a principal ray of the light flux guided to the on-axis image height $Y_0$ and a traveling direction of a principal ray of a light flux guided to a predetermined off-axis image height is represented by $\theta$.

In other words, the scanning angle $\theta$ is an angle formed by the traveling direction of the principal ray of the light flux traveling toward a predetermined image height immediately after being deflected by the deflecting unit 1005, with respect to an optical axis of the imaging optical system 85.

A scanning angle of an outermost off-axis light flux (a first outermost off-axis light flux) guided to the outermost off-axis image height $Y_{max-}$ is represented by $\theta_{max-}$, and a scanning angle of an outermost off-axis light flux (a second outermost off-axis light flux) guided to the outermost off-axis image height $Y_{max+}$ is represented by $\theta_{max+}$.

That is, the outermost off-axis image height $Y_{max-}$ is an image height that is a destination of a light flux deflected by the deflecting unit 1005 to have a principal ray of which a traveling direction forms the largest angle to an optical axis of the incident optical system 75.

In other words, the outermost off-axis image height $Y_{max-}$ is an outermost off-axis image height on the opposite side from the light source 1001 with respect to the optical axis of the imaging optical system 85 in the main scanning cross section.

The outermost off-axis image height $Y_{max+}$ is an image height that is a destination of a light flux deflected by the deflecting unit 1005 to have a principal ray of which a traveling direction forms the smallest angle to the optical axis of the incident optical system 75.

In other words, the outermost off-axis image height $Y_{max+}$ is an outermost off-axis image height on the same side as the light source 1001 with respect to the optical axis of the imaging optical system 85 in the main scanning cross section.

The light scanning apparatus 10 according to the first embodiment adopts a so-called underfilled scanning (UFS) system in which the scanned surface 1007 is scanned with an incident light flux having a light flux diameter that is sufficiently smaller than a width of each deflecting surface in the main scanning cross section.

In the light scanning apparatus 10 according to the first embodiment, the optical axis of the incident optical system 75 and the optical axis of the imaging optical system 85 are each placed in the main scanning cross section and are also arranged so as to be non-parallel to each other.

Next, various characteristics of the light scanning apparatus 10 according to the first embodiment are shown in Table 1 and Table 2 given below.

TABLE 1

| Characteristic of light source 1001 | | | | Arrangement | | |
|---|---|---|---|---|---|---|
| Wavelength | $\lambda$ (nm) | | 790 | Light source 1001 to incident surface of coupling lens 1002 | d1 (mm) | 17.13 |
| Incident optical system 75 | | | | Incident surface of | d2 | 3.00 |
| Angle formed by optical axis of incident optical system 75 with | Main scanning cross section | $\alpha$ (rad) | 0.5 $\pi$ | coupling lens 1002 to exit surface of coupling lens 1002 | (mm) | |
| respect to optical axis of imaging optical system 85 | Sub-scanning cross section | $\beta$ (rad) | 0.0 | Exit surface of coupling lens 1002 to aperture stop 1003 | d3 (mm) | 9.67 |
| Aperture stop 1003 | Main scanning cross section | p1 (mm) | 2.50 | | | |
| | Sub-scanning cross section | p2 (mm) | 1.04 | Aperture stop 1003 to deflecting surface of deflecting unit 1005 | d4 (mm) | 22.00 |
| Refractive index | | | | | | |
| Coupling lens 1002 | N2 | | 1.531 ($\lambda$ = 790 nm) | Deflecting surface of deflecting unit 1005 to incident surface of imaging lens 1006 | d5 (mm) | 22.11 |
| Imaging lens 1006 | N6 | | 1.531 ($\lambda$ = 790 nm) | | | |
| Deflecting unit 1005 | | | | Incident surface of | d6 | 8.48 |
| Number of deflecting surfaces | | N | 4 | imaging lens 1006 to exit surface of imaging lens 1006 | (mm) | |
| Circumdiameter | | $\varphi$ (mm) | 20.0 | Exit surface of | d7 | 109.42 |
| Rotation angle from $Y_0$ to $Y_{max}$ | | $\theta_{max}$ (rad) | ±0.138 $\pi$ | imaging lens 1006 to scanned surface 1007 | (mm) | |
| Width of deflecting surface | Main scanning cross section | a1 (mm) | 14.14 | | | |
| | Sub-scanning cross section | a2 (mm) | 2.00 | | | |
| Distance from rotational axis to deflecting surface | | d0 (mm) | 7.07 | | | |

TABLE 1-continued

| Imaging optical system 85 | | |
| --- | --- | --- |
| Fθ coefficient | | 126.6 |
| DIST Coefficient | α3 | −3.95 |
| | other than α3 | 0 |
| Outermost off-axis image height (mm) | $Y_{max}$ (mm) | ±107 |
| Scanning angle of ray traveling to $Y_{max}$ (rad) | $\theta_{max}$ (rad) | ±0.275 π |

TABLE 2

| Shape of coupling lens 1002 | | | Meridional line shape of imaging lens 1006 | | | Sagittal line shape of imaging lens 1006 | |
| --- | --- | --- | --- | --- | --- | --- | --- |
| | Incident surface | Exit surface | | Incident surface | Exit surface | | Incident surface | Exit surface |
| R | 0.000 | 18.687 | | +Y side | | | +Y side | |
| r | 0.000 | 1.018E+01 | R | 35.679 | 57.463 | ku | −8.591E+00 | −1.594E+00 |
| B2 | 0.000E+00 | 0.000E+00 | Ku | −2.523E−01 | −1.349E+00 | | −Y side | |
| B4 | 0.000E+00 | 0.000E+00 | B2u | 0.000E+00 | 0.000E+00 | kl | −8.591E+00 | −1.594E+00 |
| B6 | 0.000E+00 | 0.000E+00 | B4u | −2.586E−05 | −1.586E−05 | | Change in sagittal line R | Change in sagittal line R |
| | | | | | | | +Y side | |
| c1 | 0.000E+00 | 0.000E+00 | B6u | 2.872E−08 | 1.147E−08 | | | |
| c2 | 0.000E+00 | 0.000E+00 | B8u | −2.047E−11 | −1.563E−12 | r | −8.150 | −6.854 |
| c3 | −1.901E−02 | 0.000E+00 | B10u | 1.892E−15 | −3.488E−15 | E2u | 4.129E−04 | 2.245E−04 |
| c4 | 0.000E+00 | 0.000E+00 | B12u | 6.891E−18 | 2.520E−19 | E4u | 1.456E−06 | −5.927E−08 |
| c5 | −1.527E−02 | 0.000E+00 | B14u | −4.044E−21 | 2.101E−21 | E6u | −8.415E−09 | 5.769E−10 |
| | | | B16u | 5.702E−25 | −8.616E−25 | E8u | 1.350E−11 | −1.850E−12 |
| | | | | −Y side | | E10u | −7.283E−15 | −1.286E−15 |
| | | | Kl | −2.523E−01 | −1.349E+00 | E12u | −1.332E−18 | 7.562E−18 |
| | | | B2l | 0.000E+00 | 0.000E+00 | E14u | 2.123E−21 | −7.208E−21 |
| | | | B4l | −2.779E−05 | −1.743E−05 | E16u | −3.280E−25 | 2.136E−24 |
| | | | B6l | 3.576E−08 | 1.629E−08 | | −Y side | |
| | | | B8l | −2.047E−11 | −8.214E−12 | E2l | 6.509E−04 | 2.817E−04 |
| | | | B10l | 7.927E−15 | 5.813E−16 | E4l | −9.247E−07 | −3.074E−07 |
| | | | B12l | 1.075E−17 | −1.493E−18 | E6l | 2.529E−10 | 1.001E−09 |
| | | | B14l | −9.759E−21 | 3.399E−21 | E8l | −3.328E−12 | −2.750E−12 |
| | | | B16l | 2.225E−24 | −1.548E−24 | E10l | 1.407E−15 | 1.407E−15 |
| | | | | | | E12l | −1.400E−17 | 3.192E−18 |
| | | | | | | E14l | 6.765E−21 | −3.926E−21 |
| | | | | | | E16l | −1.060E−24 | 1.238E−24 |
| | | | | | | E1 | −6.407E−04 | −2.875E−04 |
| | | | | | | E2 | 0.000E+00 | 0.000E+00 |
| | | | | | | E3 | 0.000E+00 | 0.000E+00 |

In Table 2, "E-x" means "$\times 10^{-x}$."

In the light scanning apparatus 10 according to the first embodiment, an incident surface of the coupling lens 1002 has a shape of a diffracting surface indicated by a phase function φ which is expressed by the following expression (1).

$$\phi = \frac{2\pi}{\lambda}\left(c_1 X + c_2 Y + c_3 X^2 + c_4 XY + c_5 Y^2\right) \quad (1)$$

In the expression (1), $c_i$(i=1, 2, 3, 4, and 5) represents a phase function coefficient.

Further, in the light scanning apparatus 10 according to the first embodiment, respective meridional line shapes (shapes in the main scanning cross section) of an exit surface of the coupling lens 1002, and an incident surface and an exit surface of the imaging lens 1006 are represented by the following expression (2).

$$x = \frac{\dfrac{y^2}{R}}{1 + \sqrt{1 - (1+K)\left(\dfrac{y}{R}\right)^2}} + B_2 y^2 + \\ B_4 y^4 + B_6 y^6 + B_8 y^8 + B_{10} y^{10} + B_{12} y^{12} + B_{14} y^{14} + B_{16} y^{16} \quad (2)$$

In the expression (2), a local coordinate system in which a surface vertex which is a point of intersection of each lens surface (optical surface) with the optical axis is set as an origin is used, and a traveling direction of the light flux (that is, the optical axis) is set as the "x" axis, an axis orthogonal to the "x" axis in the main scanning cross section is set as the "y" axis, and an axis orthogonal to the "x" axis in the sub-scanning cross section is set as the "z" axis.

Similarly, the local coordinate system is also used in the following expressions (3) and (4).

Further, in the expression (2), R represents a curvature radius (curvature radius of meridional line) in the main scanning cross section, and K, $B_2$, $B_4$, $B_6$, $B_8$, $B_{10}$, $B_{12}$, $B_{14}$, and $B_{16}$ represent aspherical surface coefficients.

Numerical values of the aspherical surface coefficients K, $B_2$, $B_4$, $B_6$, $B_8$, $B_{10}$, $B_{12}$, $B_{14}$, and $B_{16}$ may be made different between the ty side and the −y side.

With this setting, the meridional line shape of the optical surface can be made asymmetrical with each other with respect to the optical axis in the main scanning direction.

In Table 2, the aspherical surface coefficients on the +y side are represented by $K_u$, $B_{2u}$, $B_{4u}$, $B_{6u}$, $B_{8u}$, $B_{10u}$, $B_{12u}$, $B_{14u}$, and $B_{16u}$, and the aspherical surface coefficients on the −y side are represented by $K_l$, $B_{2l}$, $B_{4l}$, $B_{6l}$, $B_{8l}$, $B_{10l}$, $B_{12l}$, $B_{14l}$, and $B_{16l}$.

Further, in the light scanning apparatus 10 according to the first embodiment, respective sagittal line shapes (shapes in the sub-scanning cross section) of the exit surface of the coupling lens 1002, and the incident surface and the exit surface of the imaging lens 1006 are represented by the following expression (3).

$$S = \frac{\frac{z^2}{r'}}{1 + \sqrt{1 - (1+k)\left(\frac{z}{r'}\right)^2}} + \sum_{j,k} M_{jk} y^j z^k \qquad (3)$$

The sagittal line shape as used herein indicates a surface shape in a cross section including a surface normal on the meridional line at each position in the main scanning direction and being perpendicular to the main scanning cross section.

Further, $M_{jk}$ in the expression (3) is an aspherical surface coefficient. Specifically, a first-degree term with respect to "z" in the expression (3) is a term contributing to a tilt amount (tilt amount of sagittal line) of the optical surface in the sub-scanning cross section.

Accordingly, the tilt amount of the sagittal line can be changed asymmetrically in the main scanning direction by making the aspherical surface coefficients $M_{0\_1u}$ to $M_{16\_1u}$ on the +y side and the aspherical surface coefficients $M_{0\_1l}$ to $M_{16\_1l}$ on the −y side different from each other.

Further, r' shown in the expression (3) represents a curvature radius (curvature radius of sagittal line) in the sub-scanning cross section at a position away from the optical axis by "y" in the main scanning direction, and is represented by the following expression (4).

$$\frac{1}{r'} = \frac{1}{r} + E_1 y^1 + E_2 y^2 + E_3 y^3 + E_4 y^4 + \qquad (4)$$
$$E_5 y^5 + E_6 y^6 + E_8 y^8 + E_{10} y^{10} + E_{12} y^{12} + E_{14} y^{14} + E_{16} y^{16}$$

In the expression (4), "r" represents a curvature radius of the sagittal line on the optical axis, and $E_1$, $E_2$, $E_3$, $E_4$, $E_5$, $E_6$, $E_8$, $E_{10}$, $E_{12}$, $E_{14}$, and $E_{16}$ represent aspherical surface coefficients (variation coefficients of sagittal line).

Numerical values of the aspherical surface coefficients $E_1$ to $E_{16}$ may be made different between the +y side and the −y side.

With this setting, an aspherical surface amount of the sagittal line shape can be set asymmetrically with each other with respect to the optical axis in the main scanning direction.

In Table 2, some of the aspherical surface coefficients on the +y side are represented by $E_{2u}$, $E_{4u}$, $E_{6u}$, $E_{8u}$, $E_{10u}$, $E_{12u}$, $E_{14u}$, and $E_{16u}$, and some of the aspherical surface coefficients on the −y side are represented by $E_{2l}$, $E_{4l}$, $E_{6l}$, $E_{8l}$, $E_{10l}$, $E_{12l}$, $E_{14l}$, and $E_{16l}$.

Next, a characteristic configuration in the light scanning apparatus 10 according to the first embodiment is described.

Figure 2A:
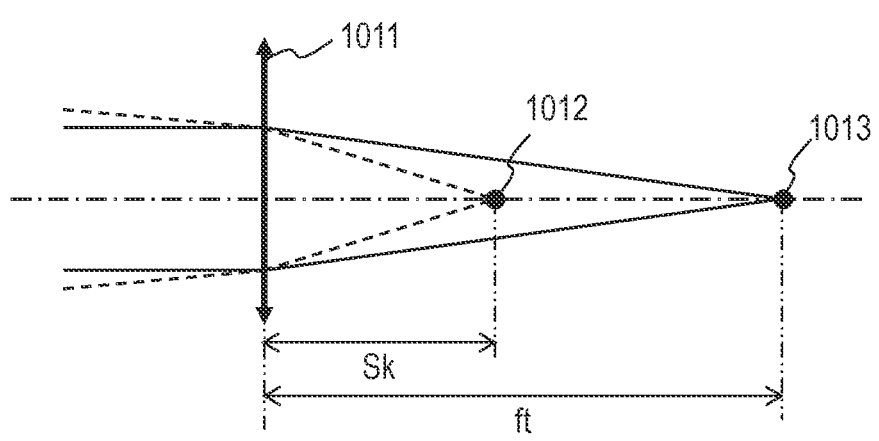
FIG. 2A is a schematic diagram for illustrating how a light flux entering an imaging optical system is condensed.
Figure 2B:
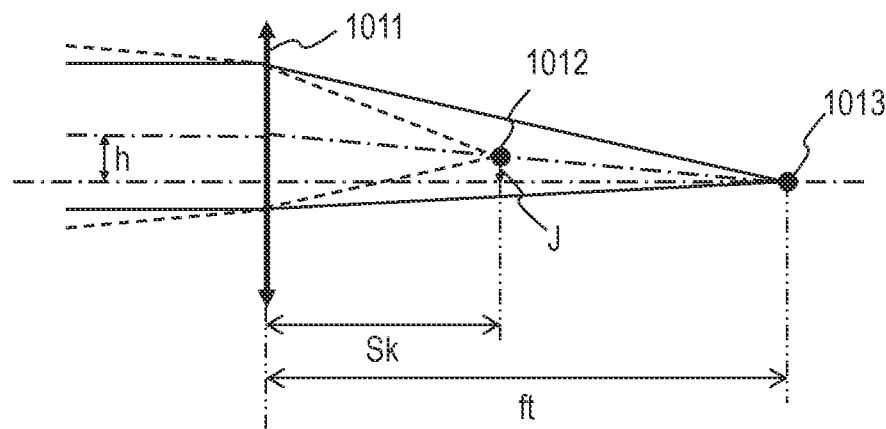
FIG. 2B is a schematic diagram for illustrating how a light flux entering the imaging optical system is condensed.

FIG. 2A and FIG. 2B show each a schematic diagram for illustrating how a light flux entering the imaging optical system 85 is condensed.

Specifically, a rear-side principal plane 1011 of the imaging optical system 85, a condensation point 1012 of a convergent light flux entering the imaging optical system 85, and a condensation point 1013 of a parallel light flux entering the imaging optical system 85 are illustrated in FIG. 2A and FIG. 2B.

In FIG. 2A, how a convergent light flux and a parallel light flux of which principal rays are incident on a position of the optical axis of the imaging optical system 85 are condensed by the imaging optical system 85 is illustrated.

A distance (an optical path length) between the rear-side principal plane 1011 and a condensation point of a light flux having a predetermined degree of convergence, and a distance (an optical path length) between the rear-side principal plane 1011 and the condensation point 1013 of the parallel light flux, along an optical path of a principal ray of an on-axis light flux traveling toward the on-axis image height $Y_0$ are represented by Sk and ft, respectively.

The distance ft is also called a focal distance of the imaging optical system 85, more specifically, a focal distance of the imaging optical system 85 in the main scanning cross section.

At this time, the degree of convergence of the light flux by the imaging optical system 85 in the main scanning cross section, that is, a main scanning magnification "m" of the imaging optical system 85 is expressed by the following expression (5).

$$m = 1 - \frac{Sk}{ft} \qquad (5)$$

In the light scanning apparatus 10 according to the first embodiment, a light flux emitted from the light source 1001 is converted into a convergent light flux by the coupling lens 1002 and, accordingly, Sk<ft and 0<m<1 are satisfied.

In a polygon mirror in general, so-called relative surface eccentricity in which a distance from a center of rotation to the deflecting surface varies from one deflecting surface to another deflecting surface is caused due to a manufacturing error or other factors, or a fitting error regarding a fit between the polygon mirror and a rotary motor.

The relative surface eccentricity in such a polygon mirror and other factors cause a phenomenon in which a position of a deflecting surface shifts forward and backward in a normal direction of the deflecting surface.

When the position of a deflecting surface in a polygon mirror shifts forward and backward in the normal direction of the deflecting surface in this manner, a point of intersection between a principal ray of a light flux entering the polygon mirror and the deflecting surface, that is, a deflection point, shifts forward and backward in the normal direction of the deflecting surface as well.

This changes an incident position of the light flux deflected by the polygon mirror in the main scanning cross section in the imaging optical system 85.

FIG. 2B shows how a convergent light flux and a parallel light flux of which principal rays are incident on at a position offset from the optical axis of the imaging optical system 85 by "h" in the main scanning cross section are condensed by the imaging optical system 85.

In a case of a parallel light flux incident on the imaging optical system 85 in a manner shown in FIG. 2B, the parallel light flux is condensed at the condensation point 1013 as in the case shown in FIG. 2A, irrespective of the offset of "h" from the optical axis of the imaging optical system 85 in incident position of the principal ray.

In a case of a convergent light flux incident on the imaging optical system 85 in the manner shown in FIG. 2B, on the other hand, the convergent light flux is condensed at, unlike the case shown in FIG. 2A, a condensation point 1012′ distanced from the condensation point 1012 by J in a direction perpendicular to the optical axis of the imaging optical system 85.

That is, the relative surface eccentricity of the polygon mirror leads to the convergent light flux being condensed at varied condensation points on the scanned surface 1007, the varied condensation points creates a cycle of the number of deflecting surfaces, a jitter depending on the cycle which is a so-called convergence-system surface eccentricity jitter is generated, and the jitter may degrade image quality.

In this case, a magnitude of offset between the condensation point 1012 and the condensation point 1012′, that is, a jitter amount J is expressed by the following expression (6), with use of an offset amount "h" by which the principal ray of the light flux entering the imaging optical system 85 is offset from the optical axis, the main scanning magnification "m" of the imaging optical system 85, and the expression (5).

$$J = mh = \left(1 - \frac{Sk}{ft}\right)h \tag{6}$$

The offset amount "h" accompanying the relative surface eccentricity of the deflecting unit 1005 is expressed by the following expression (7).

$$h = \left| \frac{d \times \sin(\theta - \alpha)}{\cos\theta \times \cos\left(\frac{\theta - \alpha}{2}\right)} \right| \tag{7}$$

In the expression (7), "d" represents an amount of offset of the deflecting surface due to the relative surface eccentricity of the deflecting unit 1005, that is, an eccentricity amount, $\alpha$ represents an angle between the optical axis of the imaging optical system 85 and the optical axis of the incident optical system 75 in the main scanning cross section, and $\theta$ represents the scanning angle.

A value of the scanning angle $\theta$ that corresponds to a predetermined image height on the plus side (+Y side) in the main scanning direction with respect to the on-axis image height is positive, and a value of the scanning angle $\theta$ that corresponds to a predetermined image height on the minus side (−Y side) in the main scanning direction with respect to the on-axis image height is negative.

In the light scanning apparatus 10 according to the first embodiment, the outermost off-axis image height $Y_{max+}$ is 107 mm, the scanning angle $\theta_{max+}$ corresponding to the outermost off-axis image height $Y_{max+}$ is 0.275 $\pi$ radian, the angle $\alpha$ is 0.5 $\pi$ radian, and the eccentricity amount "d" is 0.04 mm.

That is, in the light scanning apparatus 10 according to the first embodiment, the optical axis of the incident optical system 75 and the optical axis of the imaging optical system 85 are perpendicular to each other in the main scanning cross section.

In this case, an offset amount $h_{max+}$ in a light flux traveling to the outermost off-axis image height $Y_{max+}$ is calculated from the expression (7) as 0.0426 mm.

In the light scanning apparatus 10 according to the first embodiment, the outermost off-axis image height $Y_{max-}$ is-107 mm, and the scanning angle $\theta_{max-}$ corresponding to the outermost off-axis image height $Y_{max-}$ is −0.275 $\pi$ radian.

In this case, an offset amount $h_{max-}$ in a light flux traveling to the outermost off-axis image height $Y_{max-}$ is calculated from the expression (7) as 0.116 mm.

As described above, in the light scanning apparatus 10 according to the first embodiment, the largest jitter occurs at the outermost off-axis image height $Y_{max-}$ on the scanned surface 1007 on one side of the on-axis image height $Y_0$ that is a side without the incident optical system 75 (the opposite-to-light-source side).

In other words, a larger jitter occurs as the angle between the optical axis of the incident optical system 75 and the traveling direction of the principal ray of a light flux deflected to a predetermined image height by the deflecting unit 1005 increases.

An optical characteristic of the imaging optical system 85 provided in the light scanning apparatus 10 according to the first embodiment is described next.

First, in a related-art light scanning apparatus, the imaging optical system is set such that a distortion characteristic (hereinafter referred to as "DIST characteristic") represented by the following expression (8) is satisfied between the image height Y and the scanning angle $\theta$.

$$Y = F\theta \tag{8}$$

In the expression (8), F is called an f$\theta$ coefficient of the imaging optical system, and is equal to the focal length f ($\theta$=0) at an on-axis position of the imaging optical system, that is, ft.

That is, in the related-art light scanning apparatus, an amount of change d$\theta$ in the scanning angle $\theta$ caused by the deflecting unit and a distance dY by which the spot scans on the scanned surface when the scanning angle $\theta$ changes by the amount of change d$\theta$ has a relationship of constant velocity scanning represented by the following expression (9).

$$\frac{dY}{d\theta} = F \tag{9}$$

Further, a distance by which the spot scans on the scanned surface per unit time, that is, a scanning speed dY/dt of the spot on the scanned surface, is represented by the following expression (10).

$$\frac{dY}{dt} = \left(\frac{dY}{d\theta}\right)\left(\frac{d\theta}{dt}\right) = F\left(\frac{d\theta}{dt}\right) \tag{10}$$

In this case, the deflecting unit rotates at a constant velocity about the rotational axis, and hence d$\theta$/dt is a constant.

Thus, in the related-art light scanning apparatus, the scanning speed dY/dt of the spot on the scanned surface does not change in accordance with the scanning angle θ, that is, the image height Y.

In the light scanning apparatus 10 according to the first embodiment, on the other hand, the optical characteristic of the imaging optical system 85 is set so as to change the scanning speed dY/dt of the spot at an image height at which a large jitter occurs.

Specifically, the optical characteristic of the imaging optical system 85 is set such that a scanning speed $dY_{max-}/dt$ at the outermost off-axis image height $Y_{max-}$ is lower than a scanning speed $dY_0/dt$ at the on-axis image height $Y_0$.

In this manner, the jitter amount J expressed by the expression (6) is reduced by adjusting the refractive power of the imaging optical system 85 such that the main scanning magnification "m" is small at an image height at which the offset amount "h" is large.

More specifically, the imaging optical system 85 provided in the light scanning apparatus 10 according to the first embodiment is set such that a DIST characteristic (partial magnification) represented by the following expression (11) is satisfied between the image height Y and the scanning angle θ.

$$Y = F\theta + \sum_{i=2} \alpha_i \theta^i \tag{11}$$

In the expression (11), $\alpha_i$ ("i" is an integer equal to or more than 2) represents a DIST coefficient of the i-th degree of the imaging optical system 85, and is a coefficient indicating a non-constant speed property of the scanning speed dY/dt of the spot on the scanned surface 1007.

In the light scanning apparatus 10 according to the first embodiment, the following conditional expression (12) is satisfied at the scanning angle $\theta_{max-}$ corresponding to the outermost off-axis image height $Y_{max-}$.

$$\frac{F\theta_{max-}}{F\theta_{max-} + \sum_{i=2} \alpha_i \theta^i_{max-}} = \frac{F}{F + \sum_{i=2} \alpha_i \theta^{i-1}_{max-}} > 1 \tag{12}$$

In the light scanning apparatus 10 according to the first embodiment, the following conditional expression (13) is satisfied as well.

$$0.50 < \frac{Sk}{ft} < 1.00 \tag{13}$$

The conditional expression (13) indicates a condition about a value of a ratio of the distance Sk between the rear-side principal plane 1011 of the imaging optical system 85 and the scanned surface 1007 to the focal distance ft of the imaging optical system 85 at the on-axis position in the main scanning cross section.

When the ratio exceeds an upper limit value in the conditional expression (13), a light flux entering the imaging optical system 85 becomes a divergent light flux and, in order to accomplish size reduction of the light scanning apparatus 10 under this circumstance, the refractive power of the imaging optical system 85 is required to be strengthened. This makes it difficult to accomplish high imaging performance due to an influence from residual aberrations of a wavefront aberration and of a partial magnification, or other influences, and is accordingly unpreferable.

When the ratio falls below a lower limit value in the conditional expression (13), on the other hand, an excessive convergent light flux is incident on the imaging optical system 85. This makes it difficult to accomplish high imaging performance, and is accordingly unpreferable.

In the light scanning apparatus 10 according to the first embodiment, it is preferred that the following conditional expression (13a) be satisfied instead of the conditional expression (13).

$$0.60 < \frac{Sk}{ft} < 0.90 \tag{13a}$$

In the light scanning apparatus 10 according to the first embodiment, the following conditional expression (14) is satisfied as well.

$$0.60 < \frac{\left(\frac{dY_{max-}}{d\theta}\right)}{\left(\frac{dY_0}{d\theta}\right)} < 0.98 \tag{14}$$

The conditional expression (14) indicates a condition about a value of a ratio of a scanning speed $dY_{max-}/d\theta$ of the spot at the outermost off-axis image height $Y_{max-}$ to a scanning speed $dY_0/d\theta$ of the spot at the on-axis image height $Y_0$ on the scanned surface 1007.

When the ratio exceeds an upper limit value in the conditional expression (14), the jitter at the outermost off-axis image height $Y_{max-}$ is not reduced satisfactorily, and it is accordingly unpreferable.

When the ratio falls below a lower limit value in the conditional expression (14), on the other hand, the jitter is reduced satisfactorily, but an influence from residual aberrations of a wavefront aberration and of a partial magnification, or other influences, make it difficult to accomplish high imaging performance, and it is accordingly unpreferable.

In the light scanning apparatus 10 according to the first embodiment, it is preferred that the following conditional expression (14a) be satisfied instead of the conditional expression (14).

$$0.70 < \frac{\left(\frac{dY_{max-}}{d\theta}\right)}{\left(\frac{dY_0}{d\theta}\right)} < 0.95 \tag{14a}$$

In the light scanning apparatus 10 according to the first embodiment, it is preferred to set the DIST characteristic of the imaging optical system 85 such that the scanning speed dY/dθ decreases monotonically from the on-axis image height $Y_0$ to the outermost off-axis image height $Y_{max-}$, with no extremum.

In other words, in the light scanning apparatus 10 according to the first embodiment, the scanning speed dY/dθ is preferred to be the highest at the on-axis image height $Y_0$.

It is also preferred to set the DIST characteristic of the imaging optical system 85 such that an absolute value of a scanning acceleration $d^2Y/dt^2$, which is an amount of change in scanning speed per unit time, increases mono-tonically from the on-axis image height $Y_0$ to the outermost off-axis image height $Y_{max-}$.

Specifically, the jitter can be reduced effectively at the outermost off-axis image height $Y_{max-}$ by setting, on a right side of the expression (11) which influences the scanning acceleration, the DIST coefficient $\alpha_i$ appropriately for each calculation of a second term in which the scanning angle $\theta$ is raised to the second or higher power.

Figure 3A:
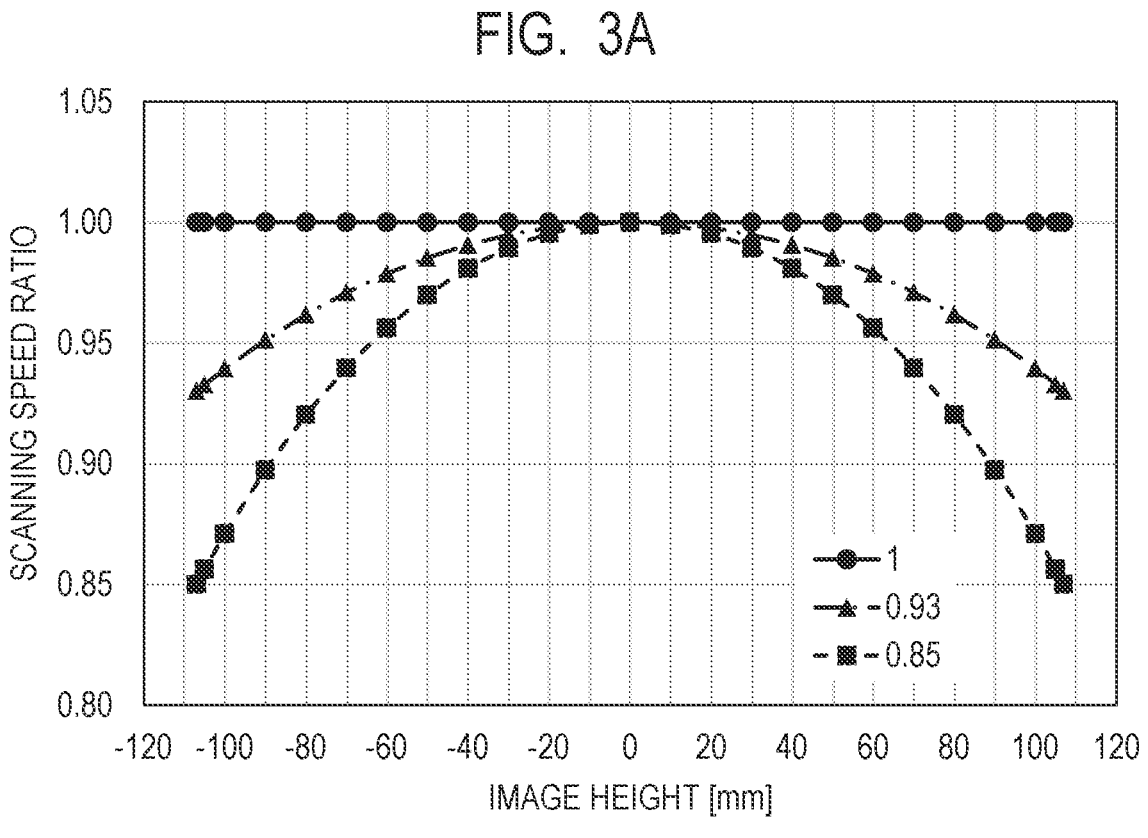
FIG. 3A is a graph for showing dependence of scanning speed on image height in the light scanning apparatus according to the first embodiment.

FIG. 3A shows a dependence of the scanning speed $dY/d\theta$ on image height in the light scanning apparatus 10 according to the first embodiment.

Specifically, a value of a ratio of the scanning speed $dY/d\theta$ at each image height to the scanning speed $dY_0/d\theta$ at the on-axis image height $Y_0$ is shown in FIG. 3A.

In FIG. 3A, graphs of dependence on image height that gives 1.00, 0.93, and 0.85 as the value of the ratio of the scanning speed $dY_{max-}/d\theta$ at the outermost off-axis image height $Y_{max-}$ to the scanning speed $dY_0/d\theta$ at the on-axis image height $Y_0$ are indicated by a solid line, a dot-dash line, and a broken line, respectively.

Figure 3B:
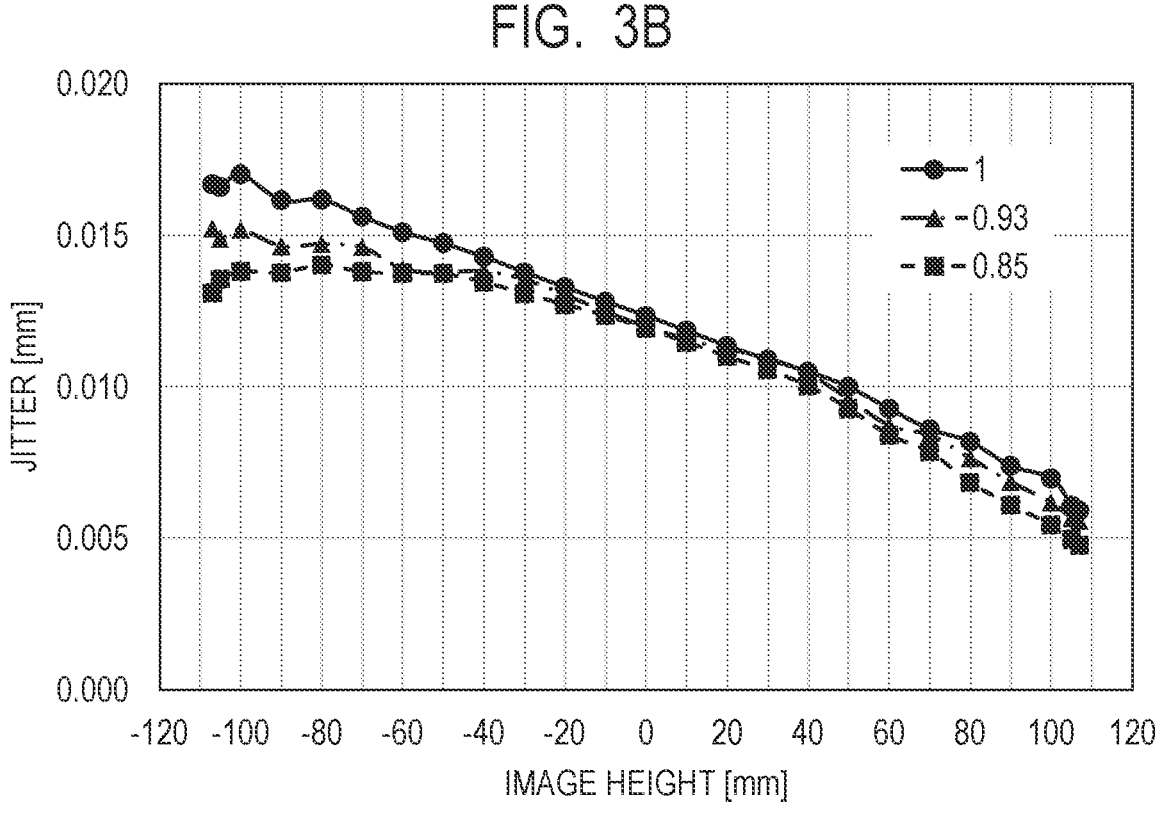
FIG. 3B is a graph for showing dependence of a jitter on image height in the light scanning apparatus according to the first embodiment.

Magnitudes of the jitter that occurs at each image height on the scanned surface 1007 when the value of the ratio is 1.00, 0.93, and 0.85 are indicated by a solid line, a dot-dash line, and a broken line, respectively, in FIG. 3B.

In FIG. 3B, the same degree of convergence of a light flux by the incident optical system 75, specifically, Sk/ft=0.864 is set to each graph.

The eccentricity amount "d" of the deflecting unit 1005 is set to 0.04 mm, and the angle $\alpha$ between the optical axis of the imaging optical system 85 and the optical axis of the incident optical system 75 in the main scanning cross section is set to 0.5 $\pi$ radian.

As can be seen in FIG. 3B, the jitter at each image height is reduced more with the decrease of the value of the ratio described above from 1.00 to 0.85.

In the light scanning apparatus 10 according to the first embodiment, the value of the ratio of the scanning speed $dY_{max-}/d\theta$ at the outermost off-axis image height $Y_{max-}$ to the scanning speed $dY_0/d\theta$ at the on-axis image height $Y_0$ is set to 0.93.

Specifically, F=127 (mm/rad), $\alpha_3=-3.95$ (mm/rad$^3$), and $\alpha_i=0$ (mm/rad$^i$) are set with regards to the DIST character-istic of the imaging optical system 85 (here, "i" is an integer equal to or more than 2 except 3).

With this setting, the jitter at the outermost off-axis image height $Y_{max-}$ can be reduced to approximately 0.015 mm.

That is, in the light scanning apparatus 10 according to the first embodiment, it is preferred that, at the same time as the following conditional expressions (15) and (16) are satisfied, at least one of values of $\alpha2j+1$ be a negative value (here, "j" is an integer equal to or more than 1).

$$\alpha_{2j} = 0 \tag{15}$$

$$\alpha_{2j+1} \leq 0 \tag{16}$$

In the light scanning apparatus 10 according to the first embodiment, it is even more preferred that the following conditional expressions (17) and (18) be satisfied (here, "k" is an integer equal to or more than 2).

$$\alpha_3 < 0 \tag{17}$$

$$\alpha_{2k+1} = 0 \tag{18}$$

As shown in FIG. 3B, the jitter at the outermost off-axis image height $Y_{max-}$ can be further reduced by setting the value of the ratio of the scanning speed $dY_{max-}/d\theta$ at the outermost off-axis image height $Y_{max-}$ to the scanning speed $dY_0/d\theta$ at the on-axis image height $Y_0$ to 0.85.

However, in the light scanning apparatus 10 according to the first embodiment, it is sufficient if the jitter at the outermost off-axis image height $Y_{max-}$ is reduced to approxi-mately 0.015 mm.

The value of the ratio described above is accordingly set to 0.93 in the light scanning apparatus 10 according to the first embodiment.

In the light scanning apparatus 10 according to the first embodiment, a value of a ratio of a scanning speed $dY_{max+}/d\theta$ at the outermost off-axis image height $Y_{max+}$ to the scanning speed $dY_0/d\theta$ at the on-axis image height $Y_0$ is set to 0.93 as well.

That is, in the light scanning apparatus 10 according to the first embodiment, it is preferred that the following condi-tional expression (14') be satisfied.

$$0.60 < \frac{\left(\frac{dY_{max+}}{d\theta}\right)}{\left(\frac{dY_0}{d\theta}\right)} < 0.98 \tag{14'}$$

Further, in the light scanning apparatus 10 according to the first embodiment, it is even more preferred that the following conditional expression (14'a) be satisfied instead of the conditional expression (14').

$$0.70 < \frac{\left(\frac{dY_{max+}}{d\theta}\right)}{\left(\frac{dY_0}{d\theta}\right)} < 0.95 \tag{14'a}$$

However, in the light scanning apparatus 10 according to the first embodiment, an angle between a traveling direction of a principal ray of a light flux traveling to the outermost off-axis image height $Y_{max+}$ and the optical axis of the incident optical system 75 is small, and the jitter at the outermost off-axis image height $Y_{max+}$ is accordingly small as shown in FIG. 3B.

Accordingly, in the light scanning apparatus 10 according to the first embodiment, the DIST characteristic of the imaging optical system 85 may be set so that the value of the ratio described above at the outermost off-axis image height $Y_{max+}$ is 1.00, or larger than 1.00 as required.

In the light scanning apparatus 10 according to the first embodiment, the jitter occurring on the scanned surface 1007 when a convergent light flux is incident can be reduced by providing the imaging optical system 85 set in the manner described above.

In the light scanning apparatus 10 according to the first embodiment, the coupling lens 1002 which is anamorphic may be replaced by a rotationally symmetrical coupling lens and a cylindrical lens having a refractive power in the sub-scanning cross section.

In the light scanning apparatus 10 according to the first embodiment, a folding mirror (reflecting surface) may be provided as required.

Second Embodiment

Figure 4:
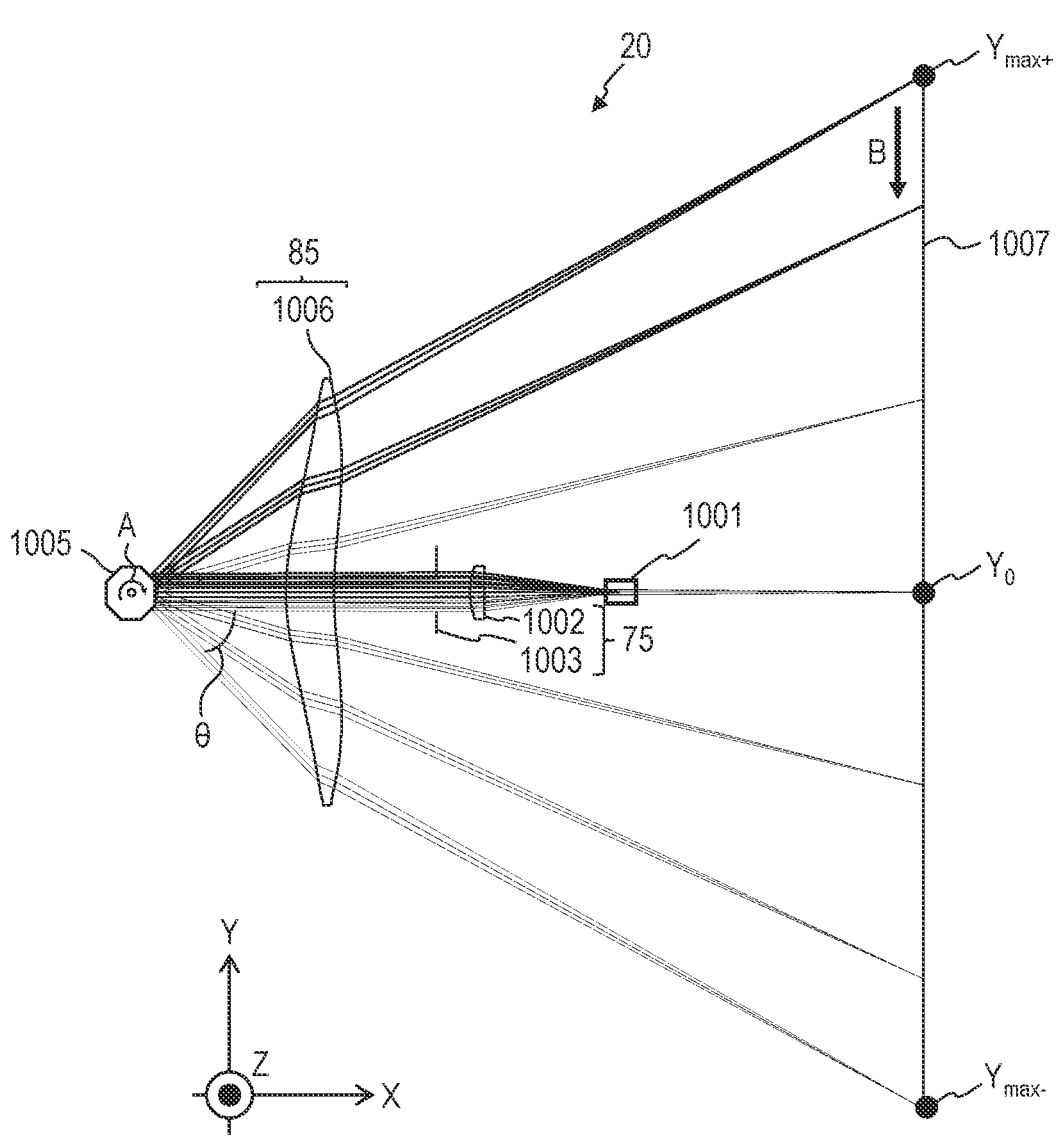
FIG. 4 is a schematic main scanning cross-sectional view of a light scanning apparatus according to a second embodiment of the present invention.

FIG. 4 shows a schematic main scanning cross-sectional view of a light scanning apparatus 20 according to a second embodiment of the present invention.

The light scanning apparatus 20 according to the second embodiment has the same configuration as the configuration of the light scanning apparatus 10 according to the first embodiment, except that different specification values are used. Accordingly, the same members are denoted by the same reference numerals, and descriptions thereof are omitted.

Specifically, the light scanning apparatus 20 according to the second embodiment adopts an overfilled scanning (OFS) system in which the scanned surface 1007 is scanned with a light flux having a light flux diameter larger than the width of each deflecting surface of the deflecting unit 1005 in the main scanning cross section including the optical axis of the imaging optical system 85.

Accordingly, the width of the aperture stop 1003 in the main scanning direction is set sufficiently wide so that the width in the main scanning cross section of a light flux entering the deflecting unit 1005 is wider than the width of each deflecting surface of the deflecting unit 1005 in the main scanning cross section.

The width in the main scanning cross section of the light flux deflected by the deflecting unit 1005 is thus determined by the width of each deflecting surface of the deflecting unit 1005 in the main scanning cross section.

The light scanning apparatus 20 according to the second embodiment adopts an oblique incident optical system in which a light flux is obliquely incident on a deflecting surface of the deflecting unit 1005 at a predetermined angle in the sub-scanning cross section.

The light scanning apparatus 20 according to the second embodiment also adopts a front incident system in which the traveling direction of the principal ray of a light flux passing through the incident optical system 75, that is, the optical axis of the incident optical system 75, is substantially parallel to the optical axis of the imaging optical system 85 in the main scanning cross section.

In the light scanning apparatus 20 according to the second embodiment, a polygon mirror having eight deflecting surfaces is used as the deflecting unit 1005. However, the deflecting unit 1005 is not limited thereto, and, for example, a polygon mirror having seven or six deflecting surfaces may be used.

The light scanning apparatus 20 according to the second embodiment which uses the OFS system is easier to reduce in size even when the number of deflecting surfaces of the deflecting unit 1005 is increased, compared to the light scanning apparatus 10 according to the first embodiment which uses the UFS system.

The light scanning apparatus 20 according to the second embodiment can accordingly raise speed and resolution in printing without increasing in size.

In the light scanning apparatus 20 according to the second embodiment, the shape of the imaging lens 1006 in the main scanning cross section can be symmetrical with respect to the optical axis of the imaging optical system 85.

This enables setting higher imaging performance in the main scanning cross section at each image height on the scanned surface 1007.

Various characteristics of the light scanning apparatus 20 according to the second embodiment are shown in Table 3 and Table 4.

TABLE 3

| Characteristic of light source 1001 | | | | Arrangement | | |
|---|---|---|---|---|---|---|
| Wavelength | λ (nm) | | 790 | Light source 1001 to incident surface of coupling lens 1002 | d1 (mm) | 28.00 |
| Incident optical system 75 | | | | Incident surface of | d2 | 3.00 |
| Angle formed by optical axis of incident optical system 75 with respect to optical axis of imaging optical system 85 | Main scanning cross section | α (rad) | 0.0 | coupling lens 1002 to exit surface of coupling lens 1002 | (mm) | |
| | Sub-scanning cross section | β (rad) | 0.0167 π | Exit surface of coupling lens 1002 to aperture stop 1003 | d3 (mm) | 7.00 |
| Aperture stop 1003 | Main scanning cross section | p1 (mm) | 14.00 | | | |
| | Sub-scanning cross section | p2 (mm) | 2.20 | Aperture stop 1003 to deflecting surface of deflecting unit 1005 | d4 (mm) | 55.00 |
| | Refractive index | | | | | |
| Coupling lens 1002 | N2 | 1.531 (λ = 790 nm) | | Deflecting surface of deflecting unit 1005 to incident surface of imaging lens 1006 | d5 (mm) | 26.72 |
| Imaging lens 1006 | N6 | 1.531 (λ = 790 nm) | | | | |

TABLE 3-continued

| Deflecting unit 1005 | | | | Incident surface of | d6 | 10.00 |
|---|---|---|---|---|---|---|
| Number of deflecting surfaces | | N | 8 | imaging lens 1006 to exit surface of imaging lens 1006 | (mm) | |
| | Circumdiameter | φ (mm) | 15.0 | Exit surface of | d7 | 122.13 |
| | Rotation angle from $Y_0$ to $Y_{max}$ | $\theta_{max}$ (rad) | ±0.128 π | imaging lens 1006 to scanned surface 1007 | (mm) | |
| Width of deflecting surface | Main scanning cross section | a1 (mm) | 2.32 | | | |
| | Sub-scanning cross section | a2 (mm) | 2.00 | | | |
| Distance from rotational axis to deflecting surface | | d0 (mm) | 6.93 | | | |
| Imaging optical system 85 | | | | | | |
| | Fθ coefficient | | 142.5 | | | |
| | DIST coefficient | α3 | −11.40 | | | |
| | | other than α3 | 0 | | | |
| | Outermost off-axis image height | $Y_{max}$ (mm) | ±107 | | | |
| | Scanning angle of ray traveling to $Y_{max}$ | $\theta_{max}$ (rad) | ±0.252 π | | | |

TABLE 4

| Meridional line shape of coupling lens 1002 | | | Sagittal line shape of coupling lens 1002 | | |
|---|---|---|---|---|---|
| | Incident surface | Exit surface | | Incident surface | Exit surface |
| +Y side | | | +Y side | | |
| R | 0.000 | 15.105 | ku | 0.000E+00 | −9.704E−01 |
| Ku | 0.000 | −3.709E+00 | −Y side | | |
| B2u | 0.000E+00 | 0.000E+00 | kl | 0.000E+00 | −9.704E−01 |
| B4u | 0.000E+00 | 8.002E−05 | | Change in sagittal line R | Change in sagittal line R |
| B6u | 0.000E+00 | 3.245E−07 | +Y side | | |
| B8u | 0.000E+00 | 0.000E+00 | r | 0.000 | 10.844 |
| B10u | 0.000E+00 | 0.000E+00 | E2u | 0.000E+00 | 0.000E+00 |
| B12u | 0.000E+00 | 0.000E+00 | E4u | 0.000E+00 | 1.904E−04 |
| B14u | 0.000E+00 | 0.000E+00 | E6u | 0.000E+00 | −5.064E−06 |
| B16u | 0.000E+00 | 0.000E+00 | E8u | 0.000E+00 | 0.000E+00 |
| −Y side | | | E10u | 0.000E+00 | 0.000E+00 |
| Kl | 0.000E+00 | −3.709E+00 | E12u | 0.000E+00 | 0.000E+00 |
| B2l | 0.000E+00 | 0.000E+00 | E14u | 0.000E+00 | 0.000E+00 |
| B4l | 0.000E+00 | 8.002E−05 | E16u | 0.000E+00 | 0.000E+00 |
| B6l | 0.000E+00 | 3.245E−07 | −Y side | | |
| B8l | 0.000E+00 | 0.000E+00 | E2l | 0.000E+00 | 0.000E+00 |
| B10l | 0.000E+00 | 0.000E+00 | E4l | 0.000E+00 | 1.904E−04 |
| B12l | 0.000E+00 | 0.000E+00 | E6l | 0.000E+00 | −5.064E−06 |
| B14l | 0.000E+00 | 0.000E+00 | E8l | 0.000E+00 | 0.000E+00 |
| B16l | 0.000E+00 | 0.000E+00 | E10l | 0.000E+00 | 0.000E+00 |
| | | | E12l | 0.000E+00 | 0.000E+00 |
| | | | E14l | 0.000E+00 | 0.000E+00 |
| | | | E16l | 0.000E+00 | 0.000E+00 |
| | | | E1 | 0.000E+00 | 0.000E+00 |
| | | | E3 | 0.000E+00 | 0.000E+00 |
| | | | E5 | 0.000E+00 | 0.000E+00 |

| Meridional line shape of imaging lens 1006 | | | Sagittal line shape of imaging lens 1006 | | |
|---|---|---|---|---|---|
| | Incident surface | Exit surface | | Incident surface | Exit surface |
| +Y side | | | +Y side | | |
| R | 47.618 | 84.357 | ku | −2.698E+00 | −5.577E−01 |
| Ku | −2.068E+00 | 3.709E−01 | −Y side | | |

TABLE 4-continued

| | | | | | |
|---|---|---|---|---|---|
| B2u | 0.000E+00 | 0.000E+00 | kl | -2.698E+00 | -5.577E-01 |
| B4u | -9.538E-06 | -8.396E-06 | | Change in | Change in |
| | | | | sagittal line R | sagittal line R |
| B6u | 1.020E-08 | 5.251E-09 | | +Y side | |
| B8u | -6.715E-12 | -1.790E-12 | r | -8.729 | -7.902 |
| B10u | 2.298E-15 | -8.503E-17 | E2u | 4.612E-03 | 1.452E-03 |
| B12u | -2.986E-19 | 1.403E-19 | E4u | 1.059E-06 | -1.677E-06 |
| B14u | 0.000E+00 | 0.000E+00 | E6u | -5.660E-10 | 1.846E-09 |
| B16u | 0.000E+00 | 0.000E+00 | E8u | 3.929E-12 | -1.035E-12 |
| | -Y side | | E10u | -1.552E-15 | 2.180E-16 |
| Kl | -2.068E+00 | 3.709E-01 | E12u | 0.000E+00 | 0.000E+00 |
| B2l | 0.000E+00 | 0.000E+00 | E14u | 0.000E+00 | 0.000E+00 |
| B4l | -9.538E-06 | -8.396E-06 | E16u | 0.000E+00 | 0.000E+00 |
| B6l | 1.020E-08 | 5.251E-09 | | -Y side | |
| B8l | -6.715E-12 | -1.790E-12 | E2l | 4.612E-03 | 1.452E-03 |
| B10l | 2.298E-15 | -8.503E-17 | E4l | 1.059E-06 | -1.677E-06 |
| B12l | -2.986E-19 | 1.403E-19 | E6l | -5.660E-10 | 1.846E-09 |
| B14l | 0.000E+00 | 0.000E+00 | E8l | 3.929E-12 | -1.035E-12 |
| B16l | 0.000E+00 | 0.000E+00 | E10l | 2.180E-16 | 2.180E-16 |
| | +Y side | | E12l | 0.000E+00 | 0.000E+00 |
| $M_{04u}$ | 2.64E-04 | 8.17E-05 | E14l | 0.000E+00 | 0.000E+00 |
| $M_{24u}$ | 3.02E-07 | 1.95E-07 | E16l | 0.000E+00 | 0.000E+00 |
| $M_{44u}$ | -2.44E-10 | 1.84E-10 | E1 | 0.000E+00 | 0.000E+00 |
| $M_{64u}$ | 3.62E-14 | -1.16E-13 | E3 | 0.000E+00 | 0.000E+00 |
| $M_{84u}$ | 0 | 0 | E5 | 0.000E+00 | 0.000E+00 |
| | -Y side | | | | |
| $M_{04u}$ | 2.64E-04 | 8.17E-05 | | | |
| $M_{24u}$ | 3.02E-07 | 1.95E-07 | | | |
| $M_{44u}$ | -2.44E-10 | 1.84E-10 | | | |
| $M_{64u}$ | 3.62E-14 | -1.16E-13 | | | |
| $M_{84u}$ | 0 | 0 | | | |

In the light scanning apparatus 20 according to the second embodiment, the outermost off-axis image height $Y_{max+}$ is 107 mm, and the scanning angle $\theta_{max+}$ corresponding to the outermost off-axis image height $Y_{max+}$ is 0.252 π radian.

In the light scanning apparatus 20 according to the second embodiment, the angle α between the optical axis of the imaging optical system 85 and the optical axis of the incident optical system 75 in the main scanning cross section is 0 radian, and the eccentricity amount "d" of the deflecting unit 1005 is 0.04 mm.

In this case, the offset amount "h" in a light flux traveling to the outermost off-axis image height $Y_{max+}$ is calculated from the expression (7) as 0.0438 mm.

In the light scanning apparatus 20 according to the second embodiment, the outermost off-axis image height $Y_{max-}$ is-107 mm, and the scanning angle $\theta_{max-}$ corresponding to the outermost off-axis image height $Y_{max-}$ is −0.252 π radian.

In this case, the offset amount "h" in a light flux traveling to the outermost off-axis image height $Y_{max-}$ is calculated from the expression (7) as 0.0438 mm.

As described above, in the light scanning apparatus 20 according to the second embodiment, the largest jitter occurs at each of the outermost off-axis image height $Y_{max+}$ and the outermost off-axis image height $Y_{max-}$ on the scanned surface 1007.

In other words, a larger jitter occurs as an absolute value |θ| of the scanning angle increases from the on-axis image height $Y_0$ to the outermost off-axis image height $Y_{max+}$, or to the outermost off-axis image height $Y_{max-}$.

In the light scanning apparatus 20 according to the second embodiment, as in the light scanning apparatus 10 according to the first embodiment, the DIST characteristic of the imaging optical system 85 is set such that the scanning speed $dY_{max+}/dt$ at the outermost off-axis image height $Y_{max+}$ is lower than the scanning speed $dY_0/dt$ at the on-axis image height $Y_0$.

The DIST characteristic of the imaging optical system 85 is also set such that the scanning speed $dY_{max-}/dt$ at the outermost off-axis image height $Y_{max-}$ is lower than the scanning speed $dY_0/dt$ at the on-axis image height $Y_0$.

That is, in the light scanning apparatus 20 according to the second embodiment, occurrence of the jitter on the scanned surface 1007 is suppressed by adjusting the refractive power such that the main scanning magnification "m" decreases as a distance grows from the optical axis in the imaging optical system 85 to the main scanning direction.

In the light scanning apparatus 20 according to the second embodiment, it is preferred that the following conditional expressions (19) and (20) be satisfied with regards to the scanning angle $\theta_{max+}$ (radian) of a light flux traveling to the outermost off-axis image height $Y_{max+}$ and the scanning angle $\theta_{max-}$ (radian) of a light flux traveling to the outermost off-axis image height $Y_{max-}$.

$$0.197\pi < \theta_{max+} < 0.300\pi \qquad (19)$$

$$-0.300\pi < \theta_{max-} < -0.197\pi \qquad (20)$$

The conditional expressions (19) and (20) each indicate a range of values of the maximum scanning angle that may be taken when any one of the polygon mirrors having six to eight surfaces is used as the deflecting unit 1005.

Figure 5A:
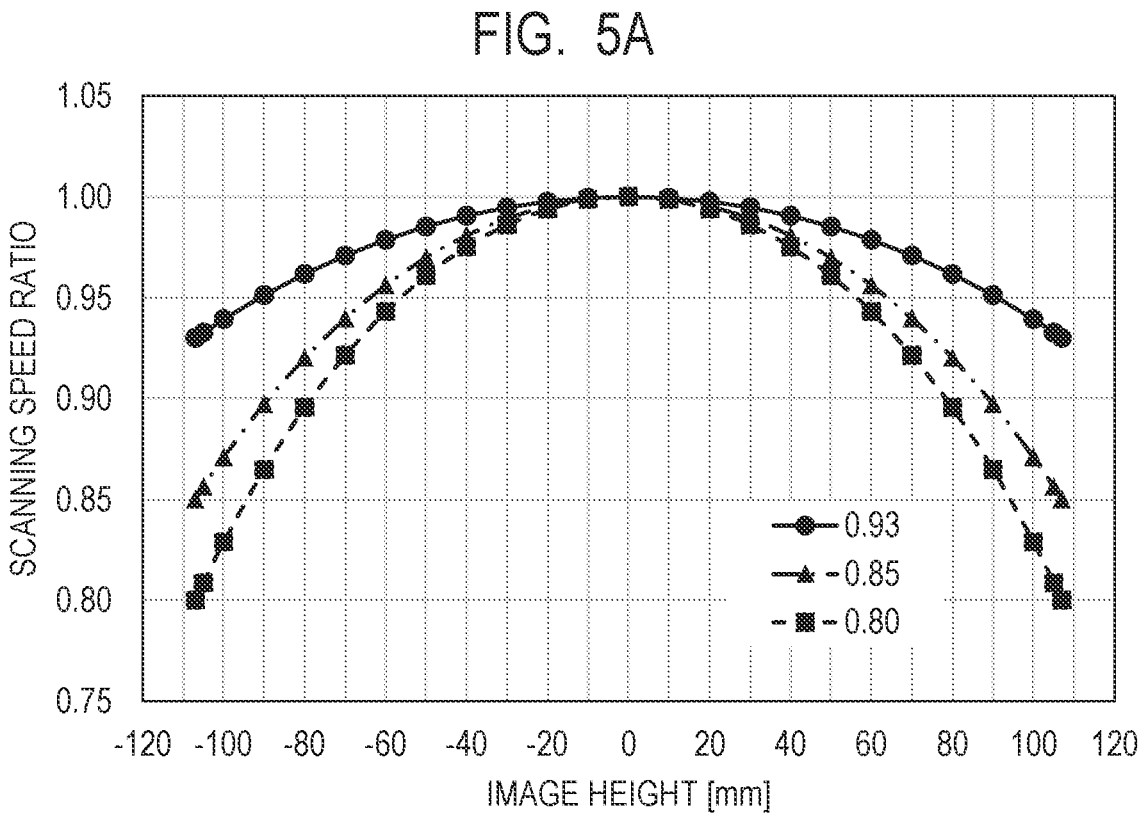
FIG. 5A is a graph for showing dependence of scanning speed on image height in the light scanning apparatus according to the second embodiment.

FIG. 5A shows dependence of the scanning speed $dY/d\theta$ on image height in the light scanning apparatus 20 according to the second embodiment.

Specifically, a value of a ratio of the scanning speed $dY/d\theta$ at each image height to the scanning speed $dY_0/d\theta$ at the on-axis image height $Y_0$ is shown in FIG. 5A.

In FIG. 5A, graphs of dependence on image height that gives 0.93, 0.85, and 0.80 as the values of the ratio of each of the scanning speed $dY_{max+}/d\theta$ and the scanning speed $dY_{max-}/d\theta$ to the scanning speed $dY_0/d\theta$ are indicated by a solid line, a dot-dash line, and a broken line, respectively.

Figure 5B:
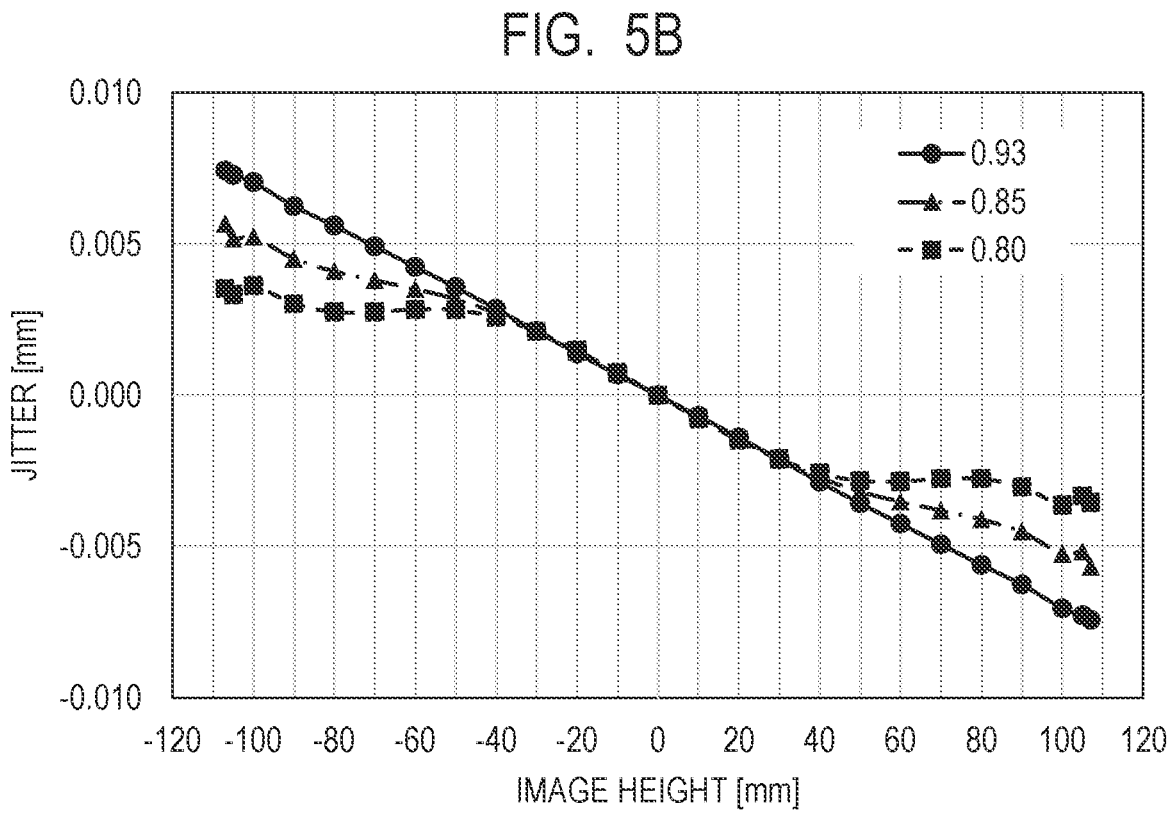
FIG. 5B is a graph for showing dependence of a jitter on image height in the light scanning apparatus according to the second embodiment.

Magnitudes of the jitter that occurs at each image height on the scanned surface 1007 when the value of the ratio is 0.93, 0.85, and 0.80 are indicated by a solid line, a dot-dash line, and a broken line, respectively, in FIG. 5B.

In FIG. 5B, the same degree of convergence of a light flux by the incident optical system 75, specifically, Sk/ft=0.857 is set to each graph.

The eccentricity amount "d" of the deflecting unit 1005 is set to 0.04 mm, and the angle $\alpha$ between the optical axis of the imaging optical system 85 and the optical axis of the incident optical system 75 in the main scanning cross section is set to 0 radian.

As can be seen in FIG. 5B, jitters in the vicinity of the outermost off-axis image height are reduced more with the decrease of the value of the ratio described above from 0.93 to 0.80.

In the light scanning apparatus 20 according to the second embodiment, the value of the ratio of each of the scanning speed $dY_{max+}/d\theta$ and the scanning speed $dY_{max-}/d\theta$ to the scanning speed $dY_0/d\theta$ is set to 0.80.

Specifically, F=143 (mm/rad), $\alpha_3$=−11.40 (mm/rad³), and $\alpha_i$=0 (mm/rad$^i$) are set with regards to the DIST characteristic of the imaging optical system 85 (here, "i" is an integer equal to or more than 2 except 3).

With this setting, the jitter at the outermost off-axis image height $Y_{max-}$ can be reduced to approximately 0.004 mm.

That is, in the light scanning apparatus 20 according to the second embodiment, it is preferred that the conditional expressions (15) and (16) given above be satisfied, and it is even more preferred that the conditional expressions (17) and (18) be satisfied.

In the light scanning apparatus 20 according to the second embodiment, the jitter occurring on the scanned surface 1007 when a convergent light flux is incident can be reduced by providing the imaging optical system 85 set in the manner described above.

Third Embodiment

Figure 6:
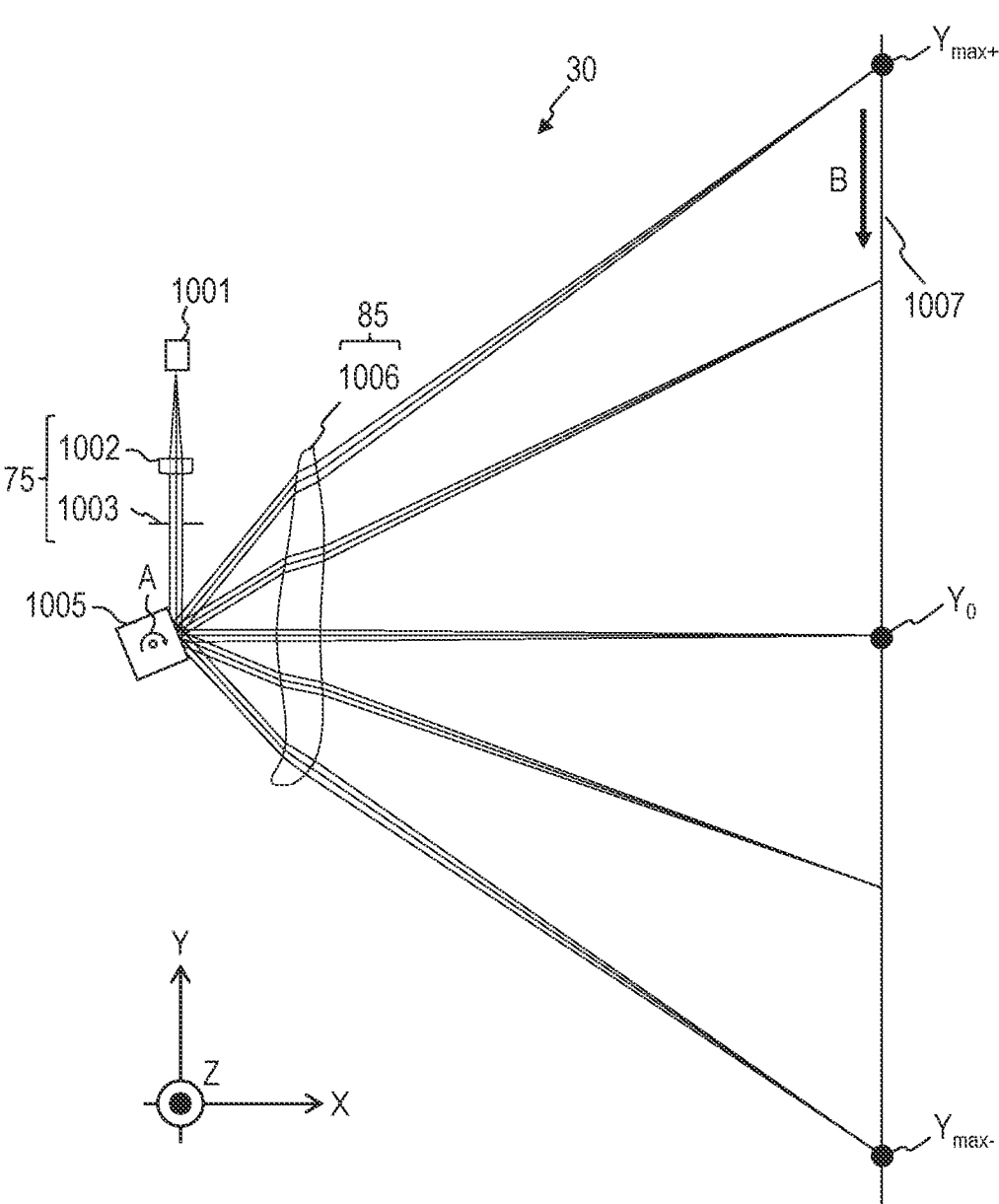
FIG. 6 is a schematic main scanning cross-sectional view of a light scanning apparatus according to a third embodiment of the present invention.

FIG. 6 shows a schematic main scanning cross-sectional view of a light scanning apparatus 30 according to a third embodiment of the present invention.

The light scanning apparatus 30 according to the third embodiment has the same configuration as the configuration of the light scanning apparatus 10 according to the first embodiment, except that different specification values are used. Accordingly, the same members are denoted by the same reference numerals, and descriptions thereof are omitted.

Specifically, in the light scanning apparatus 30 according to the third embodiment, the first scanned region on one side of the on-axis image height $Y_0$ which is a side without the incident optical system 75 and the second scanned region on the other side of the on-axis image height $Y_0$ which is a side with the incident optical system 75 placed thereon differ from each other in size.

More specifically, an absolute value of the outermost off-axis image height $Y_{max-}$ in the first scanned region is smaller than an absolute value of the outermost off-axis image height $Y_{max+}$ in the second scanned region.

Various characteristics of the light scanning apparatus 30 according to the third embodiment are shown in Table 5 and Table 6.

TABLE 5

| Characteristic of light source 1001 | | | | Arrangement | | |
|---|---|---|---|---|---|---|
| Wavelength | $\lambda$ (nm) | | 790 | Light source 1001 to incident surface of coupling lens 1002 | d1 (mm) | 17.13 |
| Incident optical system 75 | | | | Incident surface of | d2 | 3.00 |
| Angle formed by optical axis of incident optical system 75 with respect to optical axis of imaging optical system 85 | Main scanning cross section | $\alpha$ (rad) | 0.5 $\pi$ | coupling lens 1002 to exit surface of coupling lens 1002 | (mm) | |
| | Sub-scanning cross section | $\beta$ (rad) | 0.0 | Exit surface of coupling lens 1002 to aperture stop 1003 | d3 (mm) | 9.67 |
| Aperture stop 1003 | Main scanning cross section | p1 (mm) | 2.50 | | | |
| | Sub-scanning cross section | p2 (mm) | 1.04 | Aperture stop 1003 to deflecting surface of deflecting unit 1005 | d4 (mm) | 22.00 |
| Refractive index | | | | | | |
| Coupling lens 1002 | N2 | | 1.531 ($\lambda$ = 790 nm) | Deflecting surface of deflecting unit 1005 to incident surface of imaging lens 1006 | d5 (mm) | 19.82 |
| Imaging lens 1006 | N6 | | 1.531 ($\lambda$ = 790 nm) | | | |
| Deflecting unit 1005 | | | | Incident surface of | d6 | 8.50 |
| Number of deflecting surfaces N | | | 4 | imaging lens 1006 to exit surface of imaging lens 1006 | (mm) | |

TABLE 5-continued

| | | | | | | | |
|---|---|---|---|---|---|---|---|
| Circumdiameter | | φ (mm) | 20.0 | Exit surface of | d7 | 110.24 | |
| Rotation angle from Y0 to Ymax | | $\theta_{max}+$ (rad) | +0.141 π | imaging lens 1006 to scanned surface 1007 | (mm) | | |
| | | $\theta_{max}-$ (rad) | -0.131 π | | | | |
| Width of deflecting surface | Main scanning cross section | a1 (mm) | 14.14 | | | | |
| | Sub-scanning cross section | a2 (mm) | 2.00 | | | | |
| Distance from rotational axis to deflecting surface | | d0 (mm) | 7.07 | | | | |
| Imaging optical system 85 | | | | | | | |
| Fθ coefficient | | | 126.6 | | | | |
| DIST coefficient | | α3 | -4.34 | | | | |
| | | other than α3 | 0 | | | | |
| Outermost off-axis image height | | $Y_{max}+$ (mm) | 112 | | | | |
| | | $Y_{max}-$ (mm) | -102 | | | | |
| Scanning angle of ray traveling to Ymax | | $\theta_{max}+$ (rad) | +0.282 π | | | | |
| | | $\theta_{max}-$ (rad) | -0.263 π | | | | |

TABLE 6

| | Shape of coupling lens 1002 | | | Meridional line shape of imaging lens 1006 | | | Sagittal line shape of imaging lens 1006 | |
|---|---|---|---|---|---|---|---|---|
| | Incident surface | Exit surface | | Incident surface | Exit surface | | Incident surface | Exit surface |
| R | 0.000 | 18.687 | | +Y side | | | +Y side | |
| r | 0.000 | 1.018E+01 | R | 44.375 | 91.510 | ku | -3.215E+01 | -2.992E+00 |
| B2 | 0.000E+00 | 0.000E+00 | Ku | 4.402E-01 | 4.752E+00 | | -Y side | |
| B4 | 0.000E+00 | 0.000E+00 | B2u | 0.000E+00 | 0.000E+00 | kl | -3.215E+01 | -2.992E+00 |
| B6 | 0.000E+00 | 0.000E+00 | B4u | -2.186E-05 | -1.241E-05 | | Change in sagittal line R | Change in sagittal line R |
| c1 | 0.000E+00 | 0.000E+00 | B6u | 2.449E-08 | 6.608E-09 | | +Y side | |
| c2 | 0.000E+00 | 0.000E+00 | B8u | -1.854E-11 | 4.087E-13 | r | -9.825 | -7.090 |
| c3 | -1.901E-02 | 0.000E+00 | B10u | 2.122E-15 | -3.331E-15 | E2u | 4.022E-04 | 2.133E-04 |
| c4 | 0.000E+00 | 0.000E+00 | B12u | 6.455E-18 | -6.568E-21 | E4u | -8.049E-07 | -4.079E-07 |
| c5 | -1.527E-02 | 0.000E+00 | B14u | -3.906E-21 | 2.101E-21 | E6u | 1.915E-09 | 8.272E-10 |
| | | | B16u | 3.519E-25 | -9.080E-25 | E8u | -3.631E-12 | -8.215E-13 |
| | | | | -Y side | | E10u | 4.093E-15 | -1.702E-17 |
| | | | Kl | 4.402E-01 | 4.752E+00 | E12u | -2.224E-18 | 8.329E-19 |
| | | | B2l | 0.000E+00 | 0.000E+00 | E14u | 3.149E-22 | -6.913E-22 |
| | | | B4l | -2.751E-05 | -1.642E-05 | E16u | 1.022E-25 | 1.892E-25 |
| | | | B6l | 3.040E-08 | 6.836E-09 | | -Y side | |
| | | | B8l | -1.854E-11 | 7.544E-12 | E2l | 4.106E-04 | 2.108E-04 |
| | | | B10l | 1.927E-14 | -2.172E-14 | E4l | -3.180E-07 | -2.648E-07 |
| | | | B12l | -1.530E-17 | 8.522E-18 | E6l | -1.950E-10 | 5.285E-10 |
| | | | B14l | -8.285E-20 | 3.392E-21 | E8l | -1.007E-12 | -2.111E-13 |
| | | | B16l | 1.007E-22 | -8.141E-24 | E10l | -1.768E-15 | -1.768E-15 |
| | | | | | | E12l | -4.572E-18 | 4.077E-18 |
| | | | | | | E14l | -3.505E-21 | -3.271E-21 |
| | | | | | | E16l | 2.478E-24 | 4.335E-25 |
| | | | | | | E1 | -6.407E-04 | -2.875E-04 |
| | | | | | | E3 | 0.000E+00 | 0.000E+00 |
| | | | | | | E5 | 0.000E+00 | 0.000E+00 |

In the light scanning apparatus 30 according to the third embodiment, the outermost off-axis image height $Y_{max+}$ is 112 mm, and the scanning angle $\theta_{max+}$ corresponding to the outermost off-axis image height $Y_{max+}$ is 0.282 $\pi$ radian.

In the light scanning apparatus 30 according to the third embodiment, the angle $\alpha$ between the optical axis of the imaging optical system 85 and the optical axis of the incident optical system 75 in the main scanning cross section is 0.5 $\pi$ radian, and the eccentricity amount "d" of the deflecting unit 1005 is 0.04 mm.

In this case, the offset amount "h" in a light flux traveling to the outermost off-axis image height $Y_{max+}$ is calculated from the expression (7) as 0.0425 mm.

In the light scanning apparatus 30 according to the third embodiment, the outermost off-axis image height $Y_{max-}$ is -102 mm, and the scanning angle $\theta_{max-}$ corresponding to the outermost off-axis image height $Y_{max-}$ is -0.263 $\pi$ radian.

In this case, the offset amount "h" in a light flux traveling to the outermost off-axis image height $Y_{max-}$ is calculated from the expression (7) as 0.110 mm.

As described above, in the light scanning apparatus 30 according to the third embodiment, the scanning angle $\theta_{max-}$ at which the angle between the optical axis of the incident optical system 75 and the traveling direction of the principal ray of a light flux traveling to a predetermined image height after deflected by the deflecting unit 1005 is maximum is reduced.

The jitter at the outermost off-axis image height $Y_{max-}$ can thus be reduced.

Figure 7A:
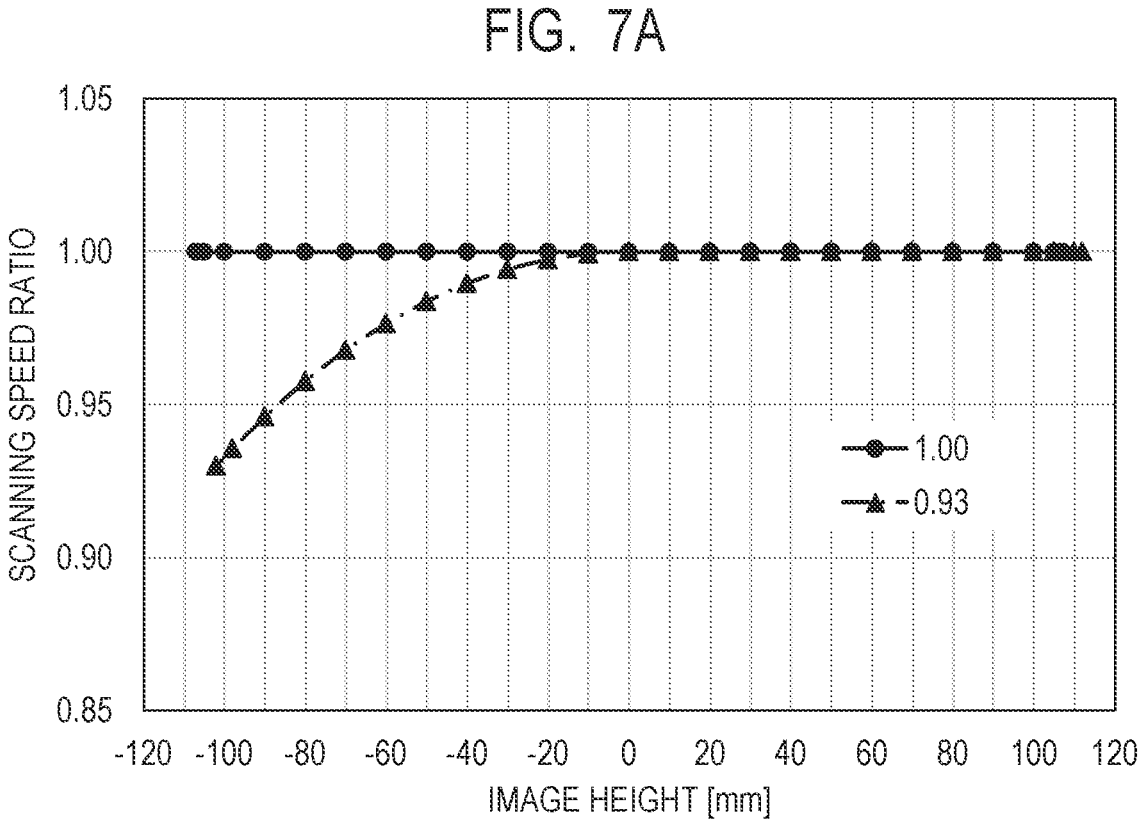
FIG. 7A is a graph for showing dependence of scanning speed on image height in the light scanning apparatus according to the third embodiment.

FIG. 7A shows a dependence of the scanning speed dY/d$\theta$ on image height in the light scanning apparatus 30 according to the third embodiment.

Specifically, a value of a ratio of the scanning speed dY/d$\theta$ at each image height to the scanning speed dY$_0$/d$\theta$ at the on-axis image height Y$_0$ is shown in FIG. 7A.

In FIG. 7A, graphs of dependence on image height that gives 1.00 and 0.93 as the value of the ratio of the scanning speed dY$_{max-}$/d$\theta$ at the outermost off-axis image height $Y_{max-}$ to the scanning speed dY$_0$/d$\theta$ at the on-axis image height Y$_0$ are indicated by a solid line and a dot-dash line, respectively.

Figure 7B:
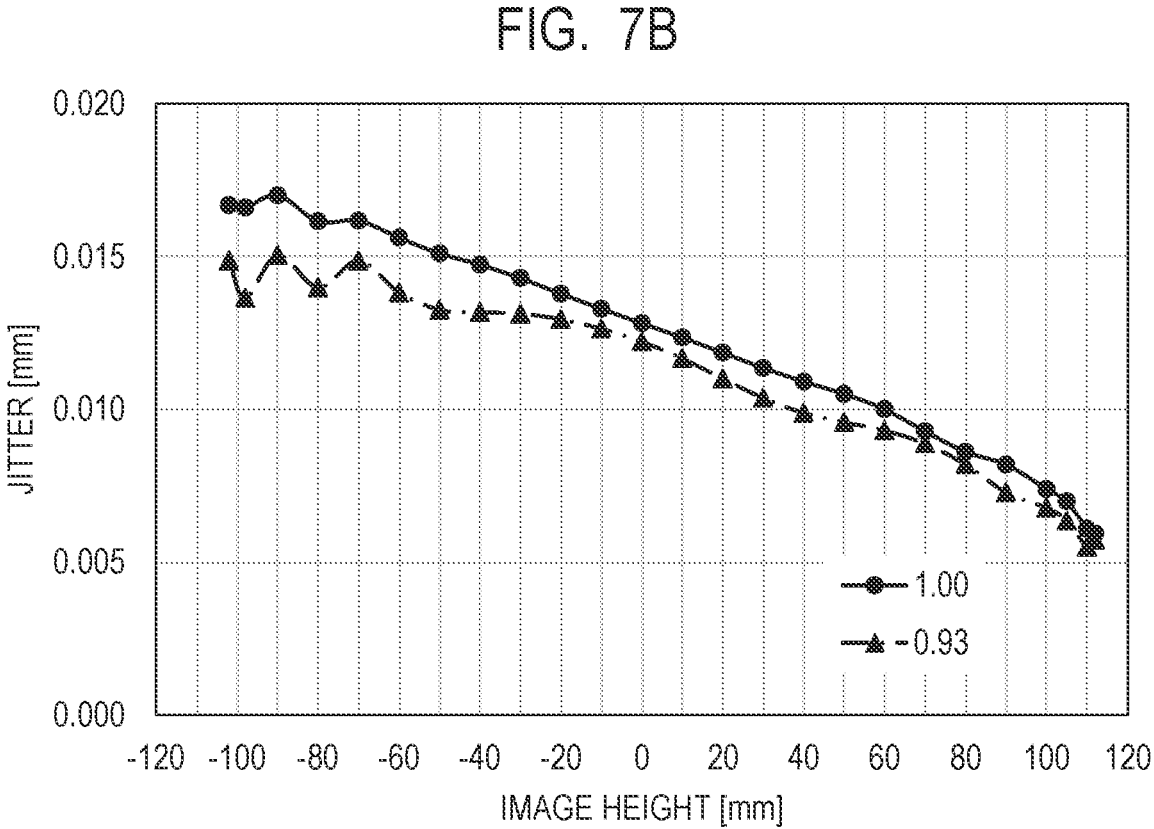
FIG. 7B is a graph for showing dependence of a jitter on image height in the light scanning apparatus according to the third embodiment.

Magnitudes of the jitter that occurs at each image height on the scanned surface 1007 when the value of the ratio is 1.00 and 0.93 are indicated by a solid line and a dot-dash line, respectively, in FIG. 7B.

In FIG. 7B, the same degree of convergence of a light flux by the incident optical system 75, specifically, Sk/ft=0.871 is set to each graph.

The eccentricity amount "d" of the deflecting unit 1005 is set to 0.04 mm, and the angle $\alpha$ between the optical axis of the imaging optical system 85 and the optical axis of the incident optical system 75 in the main scanning cross section is set to 0.5 $\pi$ radian.

As can be seen in FIG. 7B, the jitter at each image height is reduced more with the decrease of the value of the ratio described above from 1.00 to 0.93.

In the light scanning apparatus 30 according to the third embodiment, the value of the ratio of the scanning speed dY$_{max-}$/d$\theta$ at the outermost off-axis image height $Y_{max-}$ to the scanning speed dY$_0$/d$\theta$ at the on-axis image height Y$_0$ is set to 0.93. Specifically, $$F = 127(\text{mm/rad}), \alpha_3 = -4.34(\text{mm/rad}^3), \text{ and } \alpha_i = 0(\text{mm/rad}^i)$$

are set with regards to the DIST characteristic of the imaging optical system 85 in the first scanned region (here, "i" is an integer equal to or more than 2 except 3).

With this setting, the jitter at the outermost off-axis image height $Y_{max-}$ can be reduced to approximately 0.015 mm.

That is, in the light scanning apparatus 30 according to the third embodiment, it is preferred that the conditional expressions (15) and (16) given above be satisfied, and it is even more preferred that the conditional expressions (17) and (18) be satisfied.

In the light scanning apparatus 30 according to the third embodiment, F=127 (mm/rad) and $\alpha_i$=0 (mm/rad$^i$) are set with regards to the DIST characteristic of the imaging optical system 85 in the second scanned region (here, "i" is an integer equal to or more than 2).

That is, in the light scanning apparatus 30 according to the third embodiment, whereas a value of the ratio of the scanning speed dY$_{max-}$/d$\theta$ to the scanning speed dY$_0$/d$\theta$ is set to 0.93, a value of the ratio of the scanning speed dY$_{max+}$/d$\theta$ to the scanning speed dY$_0$/d$\theta$ is set to 1.00.

In the light scanning apparatus 30 according to the third embodiment, the configuration described above is designed to reduce the jitter at the outermost off-axis image height $Y_{max-}$ and expand the second scanned region.

That is, in the light scanning apparatus 30 according to the third embodiment, it is preferred that the conditional expressions (15) to (18) given above be satisfied in the first scanned region between the on-axis image height Y$_0$ and the outermost off-axis image height $Y_{max-}$.

Meanwhile, it is preferred that the following conditional expression (21) be satisfied in the second scanned region between the on-axis image height Y$_0$ and the outermost off-axis image height $Y_{max+}$ (here, "1" is an integer equal to or more than 2).

$$\alpha_1=0 \tag{21}$$

In the light scanning apparatus 30 according to the third embodiment, the jitter occurring on the scanned surface 1007 when a convergent light flux is incident can be reduced by providing the imaging optical system 85 set in the manner described above.

Values concerning the conditional expressions in the light scanning apparatus according to the first embodiment to the third embodiment are shown in Table 7 below.

TABLE 7

| Conditional expression | | First embodiment | Second embodiment | Third embodiment |
|---|---|---|---|---|
| (13) | 0.50 < Sk/ft < 1.00 | 0.864 | 0.857 | 0.871 |
| (13a) | 0.60 < Sk/ft < 0.90 | | | |
| (14) | $0.60 \le (\text{dY}_{max-}/\text{d}\theta)/(\text{dY}_0/\text{d}\theta) \le 0.98$ | 0.93 | 0.80 | 0.93 |
| (14a) | $0.70 \le (\text{dY}_{max-}/\text{d}\theta)/(\text{dY}_0/\text{d}\theta) \le 0.95$ | | | |
| (14') | $0.60 \le (\text{dY}_{max+}/\text{d}\theta)/(\text{dY}_0/\text{d}\theta) \le 0.98$ | 0.93 | 0.80 | 1.00 |
| (14'a) | $0.70 \le (\text{dY}_{max+}/\text{d}\theta)/(\text{dY}_0/\text{d}\theta) \le 0.95$ | | | |

According to the present invention, the light scanning apparatus that is small in size and yet can satisfactorily suppress occurrence of the jitter can be provided.

[Image Forming Apparatus]

Figure 8:
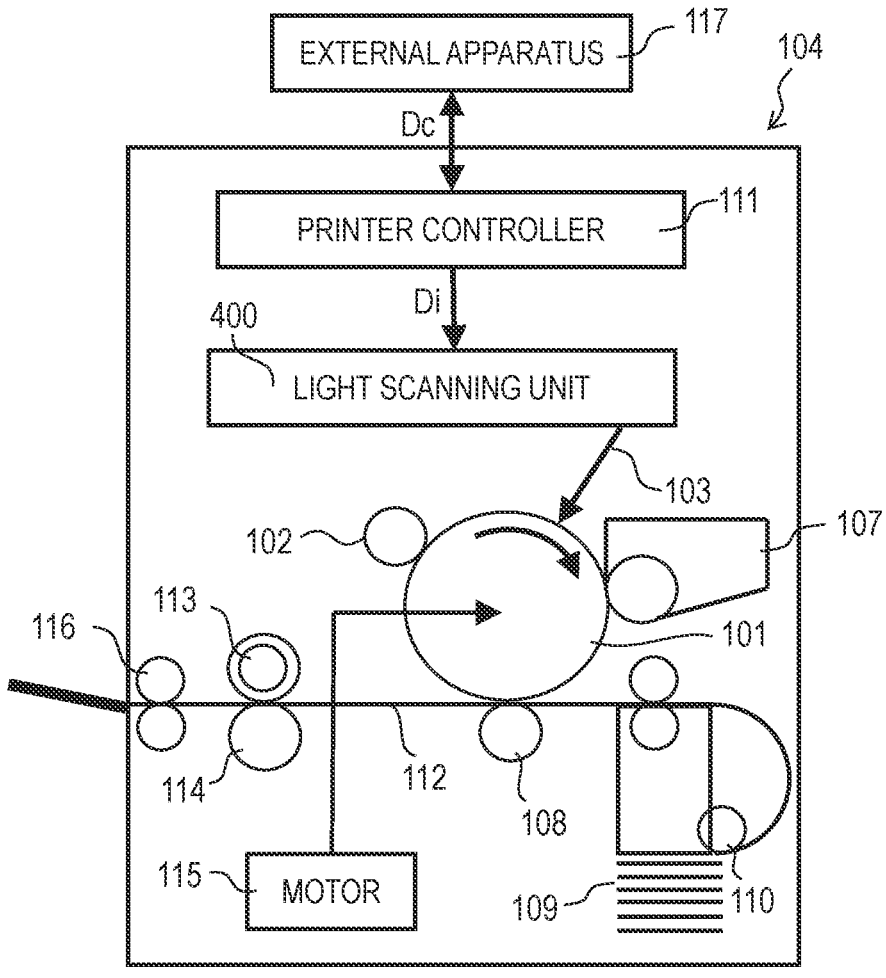
FIG. 8 is a sub-scanning cross-sectional view of a main part of an image forming apparatus according to the present invention.

FIG. 8 shows a sub-scanning cross-sectional view of a main part of an image forming apparatus (electrophotographic printer) 104 including the light scanning apparatus according to any one of the first to third embodiments.

As illustrated in FIG. 8, a signal that is output from an external apparatus 117 such as a personal computer, specifically, code data Dc, is input to the image forming apparatus 104.

Then, the input code data Dc is converted into image data (dot data) Di by a printer controller 111.

The image data Di obtained by the conversion is input to a light scanning unit 400, which is the light scanning apparatus according to any one of the first to third embodiments.

Then, a light beam (light flux) 103 modulated in accordance with the image data Di is emitted from the light scanning unit 400, and a photosensitive surface of a photosensitive drum 101 is scanned in the main scanning direction by this light beam 103.

The photosensitive drum 101 serving as an electrostatic latent image bearing body (photosensitive body) is rotated clockwise by a motor 115.

Then, along with this rotation, the photosensitive surface of the photosensitive drum 101 is moved with respect to the light beam 103 in the sub-scanning direction orthogonal to the main scanning direction.

On the upper side of the photosensitive drum 101, a charging roller 102 which uniformly charges the surface of the photosensitive drum 101 is provided in abutment against the surface of the photosensitive drum 101.

Further, the light beam 103 scanned by the light scanning unit 400 is radiated to the surface of the photosensitive drum 101 charged by the charging roller 102.

As described above, the light beam 103 is modulated based on the image data Di, and this light beam 103 is radiated to form an electrostatic latent image on the surface of the photosensitive drum 101.

Then, the formed electrostatic latent image is developed as a toner image by a developing unit 107 arranged so as to abut against the photosensitive drum 101 on the downstream side in a rotating cross section of the photosensitive drum 101 with respect to the position at which the light beam 103 is radiated.

The toner image developed by the developing unit 107 is transferred onto a sheet 112 serving as a transferred material by a transferring roller (transferring unit) 108 arranged on the lower side of the photosensitive drum 101 so as to oppose the photosensitive drum 101.

The sheet 112 is stored in a sheet cassette 109 arranged on the front side (right side of FIG. 8) of the photosensitive drum 101, but a sheet can also be fed manually.

Then, a sheet feeding roller 110 arranged at the end portion of the sheet cassette 109 sends the sheet 112 in the sheet cassette 109 to a conveyance path.

The sheet 112 having an unfixed toner image transferred thereonto as described above is further conveyed to a fixing unit arranged on the rear side (left side of FIG. 8) of the photosensitive drum 101.

The fixing unit includes a fixing roller 113 and a pressurizing roller 114. The fixing roller 113 includes a fixing heater (not shown) therein. The pressurizing roller 114 is arranged in pressure-contact with the fixing roller 113.

Then, heat and pressure are applied to the sheet 112 conveyed from the transferring roller 108 at a pressure-contact portion between the fixing roller 113 and the pressurizing roller 114 so that the unfixed toner image on the sheet 112 is fixed.

Further, sheet discharging rollers 116 are arranged on the rear side of the fixing unit, and the sheet 112 subjected to the fixing is discharged to the outside of the image forming apparatus 104.

Although not shown in FIG. 8, the printer controller 111 performs not only the above-mentioned data conversion but also control of members in the image forming apparatus 104 such as the motor 115, and control of members in the light scanning unit 400 such as a polygon motor.

In the above, the case in which the light scanning apparatus according to any one of the first to third embodiments is applied to the image forming apparatus 104 which performs monotone printing has been described, but it should be understood that the light scanning apparatus according to any one of the first to third embodiments can also be applied to a color image forming apparatus in which a plurality of photosensitive bodies are scanned by a plurality of light beams to draw images.

In this case, for example, in a color image forming apparatus in which images of four colors are superimposed, it is sufficient to arrange four light scanning apparatus according to any one of the first to third embodiments in parallel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-070793, filed Apr. 24, 2023, which is hereby incorporated by reference herein in its entirety.

What is claimed is:

1. A light scanning apparatus comprising:
a deflecting unit configured to deflect a light flux from a light source to scan a scanned surface in a main scanning direction;
an incident optical system configured to guide the light flux from the light source to the deflecting unit; and
an imaging optical system configured to guide the light flux deflected by the deflecting unit to the scanned surface,
wherein, when the deflecting unit rotates at a constant angular velocity, a scanning angle between a principal ray of the light flux immediately after being deflected by the deflecting unit and an optical axis of the imaging optical system is represented by $\theta$, an on-axis image height is represented by $Y_0$, a first outermost off-axis image height on a side opposite to the light source with respect to the optical axis of the imaging optical system in a main scanning cross section is represented by $Y_{max-}$, a focal distance of the imaging optical system in the main scanning cross section is represented by ft, and a distance between a rear-side principal plane of the imaging optical system and the scanned surface on an optical path of a principal ray of the light flux that travels to the on-axis image height is represented by Sk, the following conditions are satisfied:

$$0.60 \le \left(dY_{max-}/d\theta\right)/\left(dY_0/d\theta\right) \le 0.98;$$

$$0.50 < Sk/ft < 1.00.$$

2. The light scanning apparatus according to claim 1, wherein, when an f$\theta$ coefficient and a coefficient of an i-th degree of the imaging optical system are represented by F and $\alpha_i$, respectively, an image height Y is expressed by the following expression:

31 32

$$Y = F\theta + \sum_{i=2} \alpha_i \theta^i,$$

and
wherein, when the scanning angle of the light flux traveling to the first outermost off-axis image height is represented by $\theta_{max-}$, the following condition is satisfied:

$$\frac{F}{F + \sum_{i=2} \alpha_i \theta_{max-}^{i-1}} > 1.$$

3. The light scanning apparatus according to claim 2, wherein, in the main scanning cross section including the optical axis of the imaging optical system, a width of the light flux on a deflecting surface of the deflecting unit is narrower than a width of the deflecting surface.

4. The light scanning apparatus according to claim 3, wherein the following conditions are satisfied:

$$\alpha_{2j}=0; \text{ and}$$

$$\alpha_{2j+1} \leq 0,$$

where "j" represents an integer of 1 or more, and wherein at least one of values of $\alpha_{2j+1}$ is negative.

5. The light scanning apparatus according to claim 4, wherein the following conditions are satisfied:

$$\alpha_3 < 0; \text{ and}$$

$$\alpha_{2k+1}=0,$$

where "k" represents an integer of 2 or more.

6. The light scanning apparatus according to claim 3, wherein, in a first scanned region between the on-axis image height and the first outermost off-axis image height, the following conditions are satisfied:

$$\alpha_3 < 0; \text{ and}$$

$$\alpha_1=0,$$

where "l" is an integer of 2 or more except 3, and wherein, in a second scanned region between the on-axis image height and a second outermost off-axis image height, the following condition is satisfied:
$$\alpha_m=0,$$
where "m" is an integer of 2 or more.

7. The light scanning apparatus according to claim 3, wherein an optical axis of the incident optical system and the optical axis of the imaging optical system are non-parallel to each other in the main scanning cross section.

8. The light scanning apparatus according to claim 7, wherein the optical axis of the incident optical system and the optical axis of the imaging optical system are perpendicular to each other in the main scanning cross section.

9. The light scanning apparatus according to claim 2, wherein, in the main scanning cross section including the optical axis of the imaging optical system, a width of the light flux on a deflecting surface of the deflecting unit is wider than a width of the deflecting surface.

10. The light scanning apparatus according to claim 9, wherein the following conditions are satisfied:

$$\alpha_{2j}=0; \text{ and}$$

$$\alpha_{2j}+1 \leq 0,$$

where "j" is an integer of 1 or more, and wherein at least one of values of $\alpha_{2j+1}$ is negative.

11. The light scanning apparatus according to claim 10, wherein the following conditions are satisfied:

$$\alpha_3 < 0; \text{ and}$$

$$\alpha_{2k+1}=0,$$

where "k" is an integer of 2 or more.

12. The light scanning apparatus according to claim 9, wherein an optical axis of the incident optical system and the optical axis of the imaging optical system are parallel to each other in the main scanning cross section.

13. The light scanning apparatus according to claim 9, wherein the incident optical system is configured to cause the light flux to be obliquely incident on the deflecting unit in a sub-scanning cross section.

14. The light scanning apparatus according to claim 1, wherein a scanning speed of the light flux on the scanned surface is highest at the on-axis image height.

15. The light scanning apparatus according to claim 1, wherein a scanning acceleration of the light flux on the scanned surface has an absolute value that increases monotonically from the on-axis image height to the first outermost off-axis image height.

16. The light scanning apparatus according to claim 1, wherein, when an absolute value of the scanning angle of the light flux traveling to the first outermost off-axis image height is represented by $|\theta_{max-}|$ (radian), the following condition is satisfied:

$$0.197\pi < |\theta_{max-}| < 0.300\pi.$$

17. The light scanning apparatus according to claim 1, wherein, when a second outermost off-axis image height on the same side as the light source with respect to the optical axis of the imaging optical system in the main scanning cross section is represented by $Y_{max+}$, the following condition is satisfied:

$$0.60 \leq (dY_{max+}/d\theta)/(dY_0/d\theta) \leq 0.98.$$

18. The light scanning apparatus according to claim 1, wherein a first scanned region between the on-axis image height and the first outermost off-axis image height and a second scanned region between the on-axis image height and a second outermost off-axis image height differ from each other in size.

19. An image forming apparatus comprising:
the light scanning apparatus of claim 1;
a developing unit configured to develop, as a toner image, an electrostatic latent image formed on the scanned surface by the light scanning apparatus;
a transferring unit configured to transfer the developed toner image onto a transferred material; and
a fixing unit configured to fix the transferred toner image on the transferred material.

20. An image forming apparatus comprising:
the light scanning apparatus of claim 1; and
a printer controller configured to convert a signal output from an external apparatus into image data to input the image data to the light scanning apparatus.

* * * * *